United States Patent [19]
Yamaguchi

[11] Patent Number: 5,946,411
[45] Date of Patent: Aug. 31, 1999

[54] IMAGE READ-OUT APPARATUS

[75] Inventor: Hiroshi Yamaguchi, Kanagawa-ken, Japan

[73] Assignee: Fuji Photo Film Co., Ltd., Kanagawa-ken, Japan

[21] Appl. No.: 08/843,350

[22] Filed: Apr. 15, 1997

[30] Foreign Application Priority Data

Apr. 15, 1996 [JP] Japan .................................. 8-092590

[51] Int. Cl.$^6$ .............................. G06K 9/00; G03F 3/08
[52] U.S. Cl. ......................... 382/162; 382/167; 358/518
[58] Field of Search .................... 358/515, 527, 358/512, 514, 506, 518; 382/128, 167, 164, 162; 250/208.6, 227.23

[56] References Cited

U.S. PATENT DOCUMENTS 4,922,333  5/1990  Nutting et al. ........................ 358/506

Primary Examiner—Jose L. Couso
Assistant Examiner—Dimitry A. Novik
Attorney, Agent, or Firm—Birch, Stewart, Kolasch & Birch, LLP

[57] ABSTRACT

An image read-out apparatus includes a photoelectrical converting element whose spectral absorption peak only for green (G) light among light of three colors, red (R), green (G) and blue (B), agrees with the spectral absorption peak for green (G) light of a color photographic paper to be used for reproducing a color image recorded on a negative film. According to the thus constituted image read-out apparatus, it is possible to read out the color image recorded on the negative film or the reversal film and convert so-obtained image data to digital signals so as to enable reproduction of a color image having the same tone as that reproduced on the color photographic paper by a conventional method.

13 Claims, 12 Drawing Sheets

FIG. 11
FIG. 11(a)
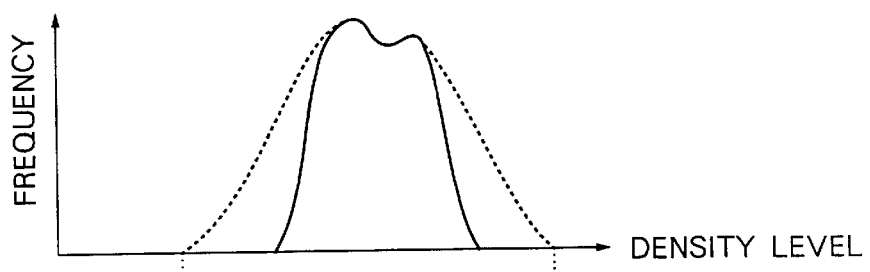
FIG. 11(b)
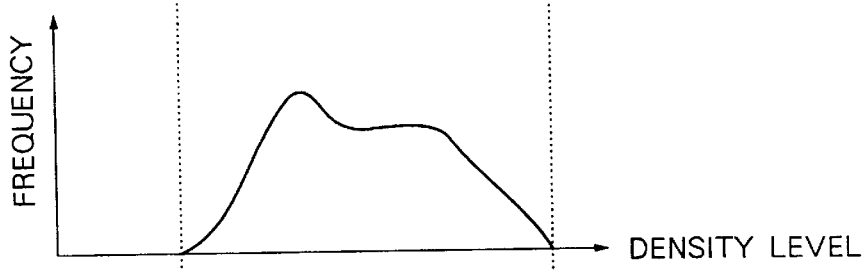
FIG. 11(c)
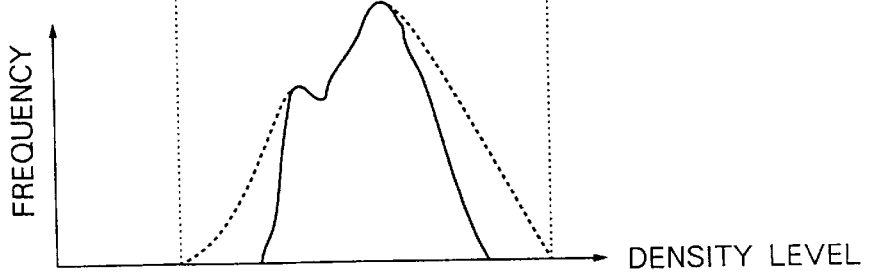

IMAGE READ-OUT APPARATUS

BACKGROUND OF THE INVENTION

The present invention relates to an image read-out apparatus and, particularly, to such an apparatus used with a color image reproducing system for photoelectrically reading out a color image recorded on a negative film, a reversal film or a color print, converting so-obtained image data to digital signals, storing image data in image data storing means such as frame memories, effecting image processing on the image data stored in the image storing means and reproducing a color image on a recording material such as a color photographic paper or a display means such as a CRT, such that the apparatus can read out a color image recorded on the negative film or the reversal film with a high S/N ratio.

DESCRIPTION OF THE PRIOR ART

There is proposed a color image reproducing system for photoelectrically reading a color image recorded on a negative film, a reversal film, a color print or the like using a photoelectrical conversion element such as a CCD (charge coupled device), converting so-obtained color image data to digital signals, storing the image data in a frame memory, effecting image processing on the image data stored in the frame memory, and reproducing a color image on a recording material such as a color photographic paper.

According to this color image reproducing system, even if a color image is taken under improper conditions such as under-exposure, over-exposure or the like and recorded on a negative film, a reversal film, a color print or the like, a color image having desired tone and gradation can be reproduced by effecting image processing on the image data, and if desired, based on a color image recorded on a negative film, a reversal film, a color print or the like, a color image having different tone and gradation can be reproduced. This color image reproducing system is therefore advantageous.

The image read-out apparatus in this color image reproducing system preferably has the same sensitivity characteristics as those of a color photographic paper for reproducing a color image recorded on a negative film or a reversal film on the color photographic paper.

However, since the spectral absorption peak of cyan dye of a negative film is considerably toward the longer wavelength side from the spectral absorption peak of cyan dye of a reversal film, the photosensitive material used in a color photographic paper is prepared so that the red (R) sensitivity of the color photographic paper is considerably toward the longer wavelength side so as to be matched to the spectral absorption peak of the cyan dye of the negative film. Therefore, in the case where the sensitivity of the image read-out apparatus is matched to the red (R) sensitivity of color photographic paper, it becomes necessary, for read-out of a color image recorded on a reversal film, to adjust the sensitivity of the image read-out apparatus by, for example, changing a filter. This makes the operation troublesome.

Further, the yellow density of a negative film is generally high and the photosensitive material is prepared so that the blue (B) sensitivity of the color photographic film agrees with the spectral absorption peak of the yellow dye of the negative film. Therefore, in the case where the blue (B) sensitivity of the image read-out apparatus is set to be equal to that of color photographic paper, an image read-out apparatus capable of photoelectrically detecting extremely weak light is needed. This makes the image read-out apparatus costly.

SUMMARY OF THE INVENTION

It is therefore an object of the present invention to provide an image read-out apparatus used with a color image reproducing system for photoelectrically reading out a color image recorded on a negative film, a reversal film or a color print, effecting image processing on the image data produced by converting so-obtained image data to digital signals and reproducing a color image, specifically such an image read-out apparatus for reading out a color image recorded on the negative film or the reversal film and capable of reading out the color image recorded on the negative film or the reversal film and converting so-obtained image data to digital signals so as to enable reproduction of a color image having the same tone as that reproduced on the color photographic paper by a conventional method.

The above and other objects of the present invention can be accomplished by an image read-out apparatus comprising a photoelectrical converting element whose spectral absorption peak only for green (G) light among light of three colors, red (R), green (G) and blue (B), agrees with the spectral absorption peak for green (G) light of a color photographic paper to be used for reproducing a color image recorded on a negative film.

The spectral absorption characteristics of cyan dye of a negative film and the spectral absorption characteristics of magenta dye of a reversal film are very similar. Therefore, in the case where the spectral absorption peak for green (G) light of the photoelectrical converting element agrees with the spectral absorption peak for green (G) light of a color photographic paper, it is possible to read-out a color image recorded on the reversal film. To the contrary, the spectral absorption peak of cyan dye of the negative film is considerably toward longer wavelength from the spectral absorption peak of cyan dye of the reversal film. Therefore, in the case where the spectral absorption peak for red (R) light of the photoelectrical converting element agrees with the spectral absorption peak for red (R) light of the color photographic paper, it is difficult to read-out a color image recorded on the reversal film in a desired manner. Further, in the case where the spectral absorption peak for blue (B) light of the photoelectrical converting element agrees with the spectral absorption peak for blue (B) light of the color photographic paper, since the yellow density of the negative film is high and extremely weak light has to be detected, it is difficult to read-out a color image recorded on the negative film in a desired manner.

However, even if the peaks of spectral absorption for red (R) light and blue (B) light of the photoelectrical converting element do not agree with those of the spectral absorption for red (R) light and blue (B) light of the color photographic paper, if only the spectral absorption peak for green (G) light agrees with the spectral absorption peak for green (G) light of the color photographic paper, a color image having the same tone characteristics as those of a color image reproduced on the color photographic paper by a conventional method can be reproduced by using G image data corresponding to green light in image data obtained by reading out a color image as reference and effecting signal processing on R image data corresponding to red light and B image data corresponding to blue light.

Therefore, according to the present invention, it is possible to read out the color image recorded on a negative film or a reversal film and convert so-obtained image data to digital signals so as to enable reproduction of a color image having the same tone as that reproduced on the color photographic paper by a conventional method.

In a preferred aspect of the present invention, the spectral sensitivity of the photoelectrical converting element is determined so that the spectral absorption peak for red (R) light thereof is located on the side of shorter wavelength than the spectral absorption peak of cyan dye of the negative film and on the side of longer wavelength than the spectral absorption peak of cyan dye of the reversal film and that the spectral absorption peak for blue (B) light thereof does not agree with the spectral absorption peak of yellow dye of the negative film.

In the present invention, the photoelectrical converting element whose spectral absorption peak for lights of certain colors are different from the peaks of spectral absorption sensitivity for lights of the colors of a color photographic paper and whose spectral absorption peak for light of another color agrees with the spectral absorption peak sensitivity for light of the color of the color photographic paper is not limited to a photoelectrical converting element having such spectral absorption characteristics but may also be a photoelectrical converting element whose spectral absorption characteristics are to such spectral absorption characteristics using a filter or the like.

The above and other objects and features of the present invention will become apparent from the following description made with reference to the accompanying drawings.

BRIEF DESCRIPTION OF THE DRAWINGS

FIGS. 11A, 11B, and 11C show graphs for explaining density correction processing effected by color density gradation converting means.

DESCRIPTION OF THE PREFERRED EMBODIMENTS

Figure 1:
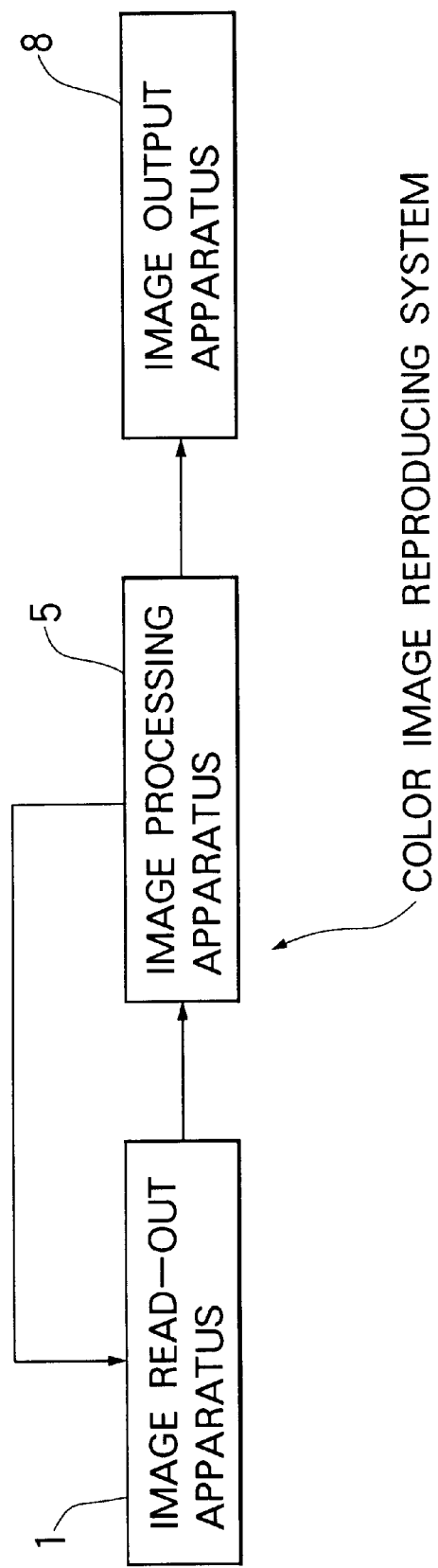
FIG. 1 is a block diagram of a color image reproducing system including an image read-out apparatus which is an embodiment of the present invention.
Figure 3:
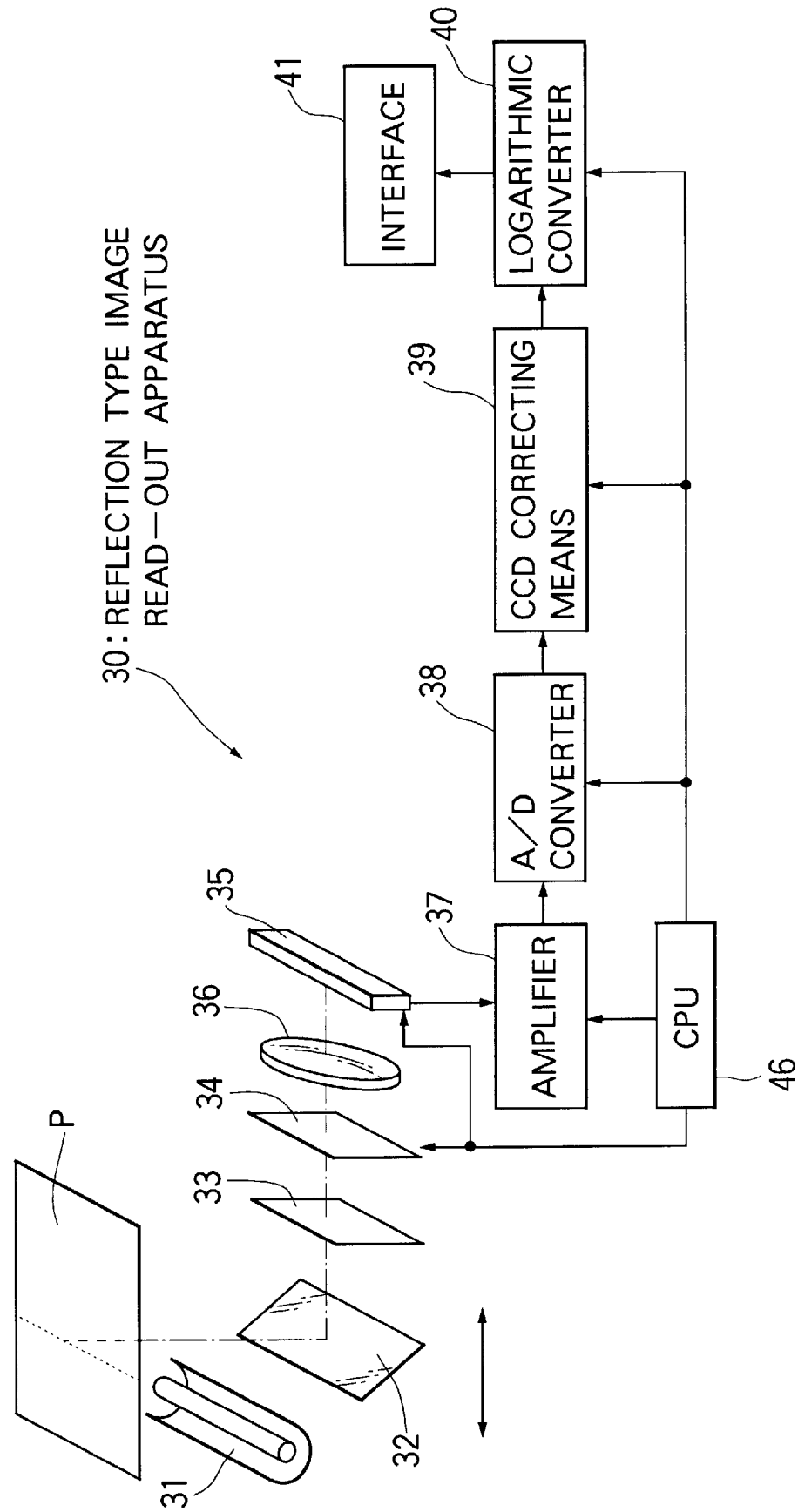
FIG. 3 is a schematic view of a reflection type image read-out apparatus for a color image reproducing system, which is an embodiment of the present invention.

As shown in FIG. 1, a color image reproducing system comprises an image read-out apparatus 1 for reading a color image and generating digitized image data, an image processing apparatus 5 for carrying out prescribed image processing on the image data generated by the image read-out apparatus 1 and an image output apparatus 8 for reproducing a color image based on the image data image processed by the image processing apparatus 5. The color image reproducing system is configured so that two types of image read-out apparatuses can be selectively connected with the image processing apparatus 5 as the image read-out apparatus 1, a transmission type image read-out apparatus 10 for photoelectrically reading a color image recorded on a film F such as a negative film or reversal film and a reflection type image read-out apparatus 30 such as shown in FIG. 3 for photoelectrically reading a color image recorded on a color print P. As a result, the color image reproducing system can reproduce both color images recorded on negative, reversal or other such films F and color images recorded on color prints P.

Figure 2:
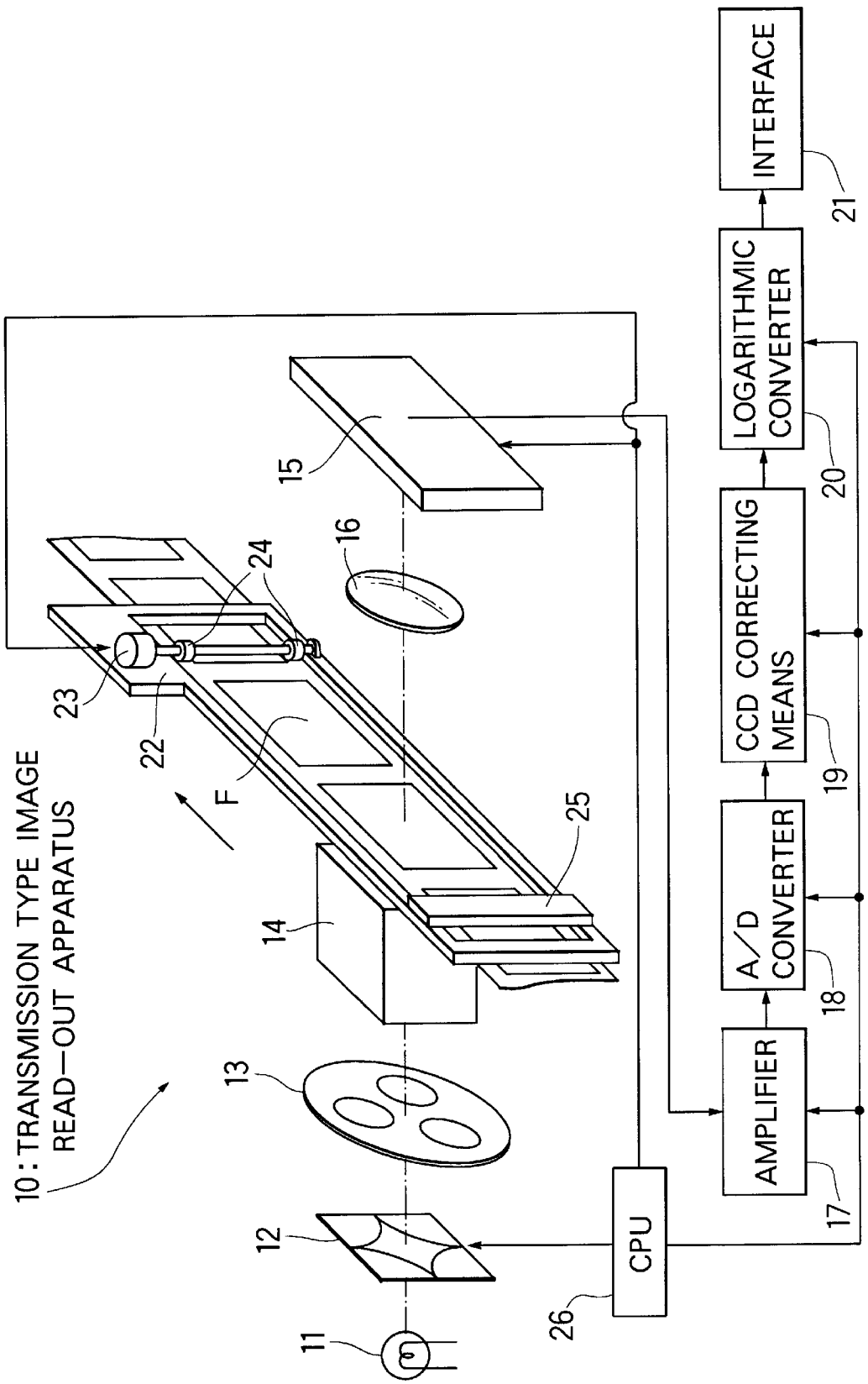
FIG. 2 is a schematic view of a transmission type image read-out apparatus for a color image reproducing system, which is an embodiment of the present invention.

FIG. 2 is a schematic view showing a transmission type image read-out apparatus 10 for a color image reproducing system, which is an embodiment of the present invention.

As shown in FIG. 2, the transmission type image read-out apparatus 10 is adapted to photoelectrically read a color image by directing light onto a color image recorded on a negative, reversal or other such film F and detecting the light transmitted through the film F. It comprises a light source 11, a light regulating unit 12 for regulating the passage of the light emitted by the light source 11, a color separation unit 13 for separating the light emitted by the light source 11 into red (R), green (G) and blue (B) color components, a diffusing unit 14 for diffusing the light emitted by the light source 11 so that it evenly illuminates the film F, a CCD area sensor 15 for photoelectrically detecting the light transmitted through the film F and a lens 16 for focusing the light transmitted through the film F on the CCD area sensor 15.

In this embodiment, the spectral sensitivity of the CCD area sensor 15 is set so that the peak of spectral sensitivity for green (G) light thereof agrees with the peak of spectral sensitivity for green (G) light of a color photographic paper to be used for reproducing a color image recorded on a negative film, that the peak of spectral sensitivity for red (R) light thereof is located on the side of shorter wavelength than the spectral absorption peak of cyan dye of the negative film and on the side of longer wavelength than the spectral absorption peak of cyan dye of the reversal film and that the peak of spectral sensitivity for blue (B) light thereof does not agree with the spectral absorption peak of yellow dye of the negative film.

The transmission type image read-out apparatus 10 further includes an amplifier 17 for amplifying R, G, B image signals generated by the CCD area sensor 15 based on the photoelectrically detected R, G and B color components, an A/D converter 18 for digitizing the image signals, CCD correcting means 19 for processing the digitized image signals from the A/D converter 18 to correct for dark current and variance in sensitivity among the individual pixels and a logarithmic converter 20 for converting R, G, B image data into density data. The logarithmic converter 20 is connected with an interface 21.

The film F is held in a carrier 22. After one frame of the film F held in the carrier 22 has been conveyed to a prescribed position by rollers 24 driven by a motor 23, it is maintained stationary for read-out. When read-out of the color image of the frame has been completed, the next frame is conveyed to the read-out position. Reference numeral in FIG. 2 designates a picture region detection sensor which detects the density distribution of the color images recorded on the film F and outputs a density signal indicative of the detected density to a CPU (central processing unit) 26 for controlling the transmission type image read-out apparatus 10. The CPU 26 uses the density signal to calculate the position of the color image picture region and stop the motor 23 when it discriminates that the color image picture region has reached the prescribed position.

In the transmission type image read-out apparatus 10, red light is first directed onto the film F and the CCD area sensor 15 photoelectrically detects the light transmitted through the film F to generate R image data corresponding to one frame of the film F. The generated R image data corresponding to one frame are transferred to the image processing apparatus 5 every ten bits. Green light is then directed onto the film F and the CCD area sensor 15 photoelectrically detects the light transmitted through the film F to generate G image data corresponding to one frame of the film F. The generated G image data corresponding to one frame are transferred to the image processing apparatus 5 every ten bits. Blue light is finally directed onto the film F and the CCD area sensor 15 photoelectrically detects the light transmitted through the film F to generate B image data corresponding to one frame of the film F. The generated B image data corresponding to one frame are transferred to the image processing apparatus 5 every ten bits. As a result, the transmission type image read-out apparatus 10 transfers the generated image data every one frame of R, G, B image data to the image processing apparatus 5.

FIG. 3 is a schematic view of a reflection type image read-out apparatus 30 for a color image reproducing system.

As shown in FIG. 3, the reflection type image read-out apparatus 30 is adapted to photoelectrically read a color image by directing light onto a color image recorded on a color print P and detecting the light reflected by the color print P. It comprises a light source 31, a mirror 32 for reflecting light emitted by the light source and reflected by the surface of the color print P, a color balance filter 33 for adjusting the R, G, B sensitivity of the light reflected by the surface of the color print P, a light regulating unit 34 for regulating the passage of the light reflected by the surface of the color print P, a CCD line sensor 35 for photoelectrically detecting the light reflected by the color print P and a lens 36 for focusing the light reflected by the color print P on the CCD line sensor 35. The CCD line sensor 35 is constituted to have three lines corresponding to three colors, R, G and B. The CCD line sensor 35 reads the color image recorded on the color print P two-dimensionally by detecting light reflected from the color print P while the light source 31 and the mirror 32 are moved in the direction indicated by an arrow.

The reflection type image read-out apparatus 30 further includes an amplifier 37 for amplifying R, G, B image signals generated by the CCD line sensor 35 based on the photoelectrically detected R, G and B color components, an A/D converter 38 for digitizing the image signals, CCD correcting means 39 for processing the digitized image signals from the A/D converter 38 to correct for dark current and variance in sensitivity among the individual pixels and a logarithmic converter 40 for converting R, G, B image data into density data. The logarithmic converter 40 is connected with an interface 41.

The reflection type image read-out apparatus 30 is equipped with a carrier (not shown) for holding the color print P stationary and drive means (not shown) for conveying the light source 31 and the mirror 32 in the direction of the arrow. The reflection type image read-out apparatus 30 is controlled by a CPU 46.

In this embodiment, the reflection type image read-out apparatus 30 is constituted so that the CCD line sensor 35 including three line sensors corresponding to three colors, R, G and B, is moved over the color image recorded on the color print P and while generating image data corresponding to the three colors, R, G and B, it progressively transfers the generated image data to the image processing apparatus 5. As a result, the reflection type image read-out apparatus 30 of this embodiment transfers the image data every twelve bits and pixel by pixel to the image processing apparatus 5 in order of R image data of a first pixel, G image data of the first pixel, B image data of the first pixel, R image data of a second pixel, G image data of the second pixel, B image data of the second pixel, and so on.

Figure 4:
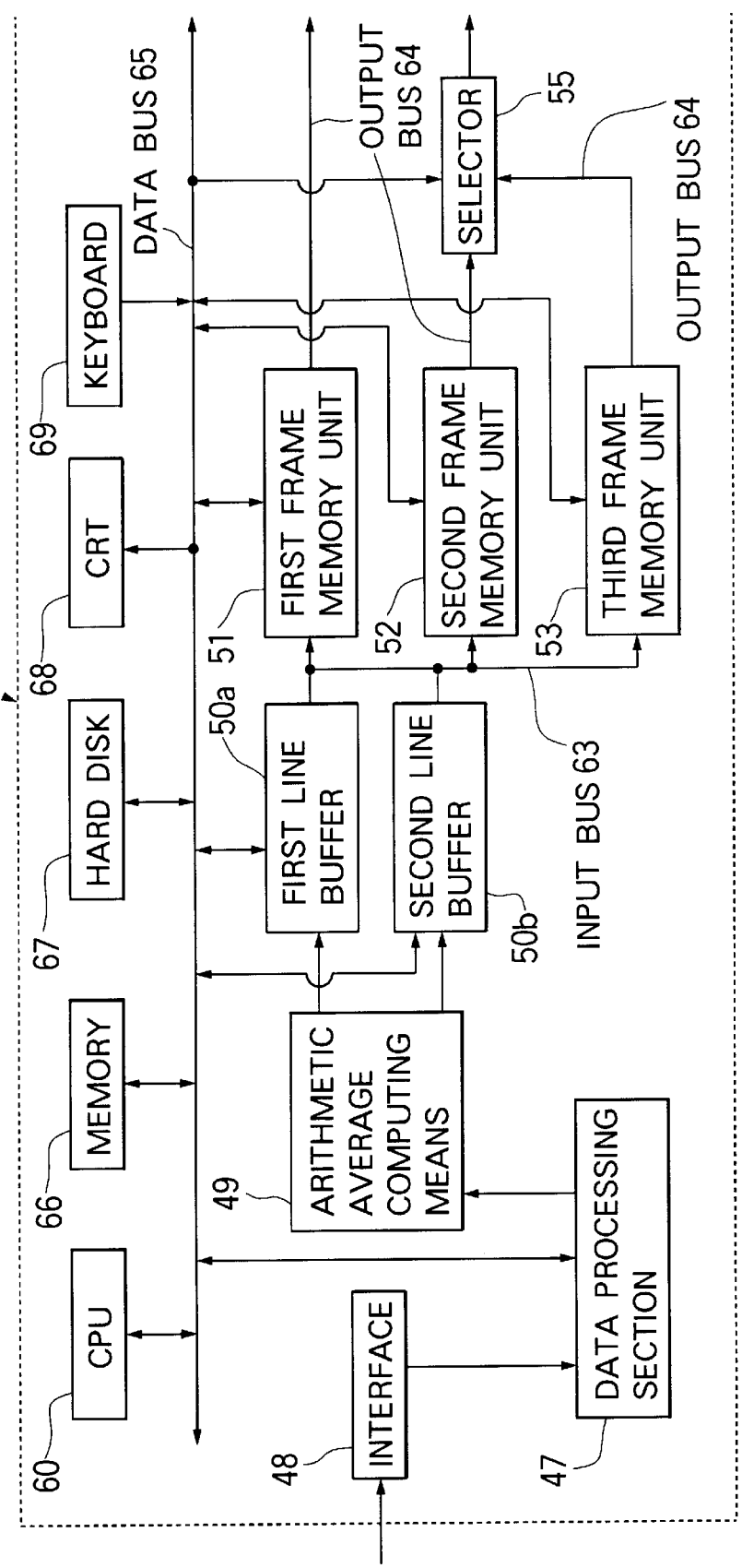
FIG. 4 is a block diagram showing one example of an image processing apparatus.
Figure 5:
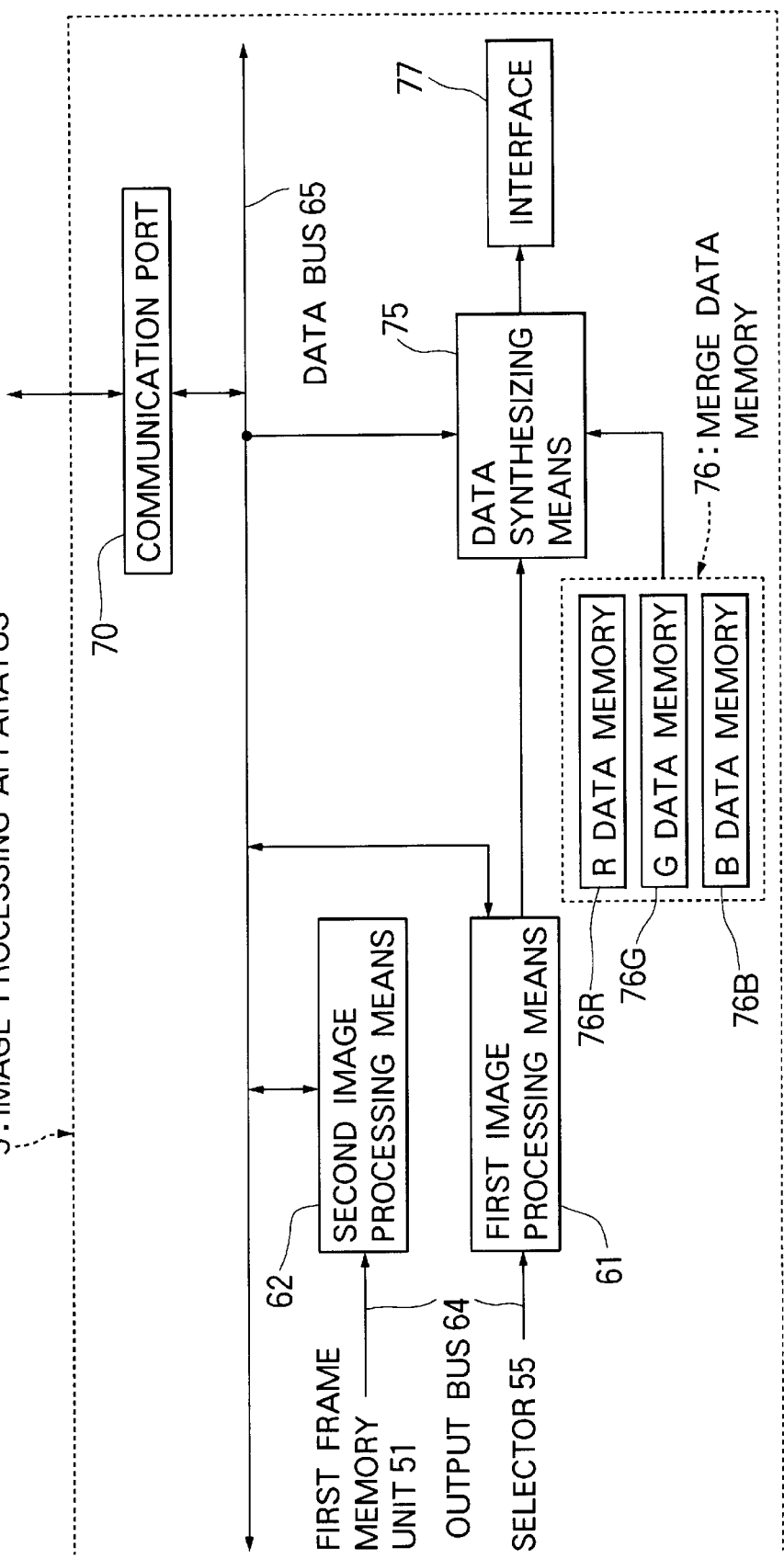
FIG. 5 is a block diagram showing one example of an image processing apparatus.

FIGS. 4 and 5 are block diagrams of an image processing apparatus 5 used for a color image reproducing system including an image read-out apparatus which is an embodiment of the present invention.

As shown in FIGS. 4 and 5, the image processing apparatus 5 comprises an interface 48 which can be connected to the interface 21 of the transmission type image read-out apparatus 10 or the interface 41 of the reflection type image read-out apparatus 30, a data processing section 47 for effecting processing such as the change in number of bits, reversal between negative and positive or the like on the image data forwarded by the transmission type image read-out apparatus 10 or the reflection type image read-out apparatus 30, arithmetic average computing means 49 for summing and averaging the values of sets of two adjacent pixels of the image data forwarded by the image read-out apparatus 1 and defining each average value as a single pixel, a first line buffer 50a and a second line buffer 50b for storing alternate lines of the image data, and a first frame memory unit 51, a second frame memory unit 52 and a third frame memory unit 53 for receiving line data stored in the line buffers 50a, 50b and transferred therefrom and storing image data corresponding to a color image recorded in one frame of the film F or in one color print P. The first line buffer 50a and the second line buffer 50b are configured so that pixels in odd numbers of each line of the image data are stored in one of the line buffers and that pixels in even numbers thereof are alternately stored in the other line buffer.

The arithmetic average computing means 49 is constituted so as to sum and average the values of sets of two adjacent pixels of the image data continuously forwarded every ten bits by the transmission type image read-out apparatus 10 to define the average value as single pixels and sum and average the values of sets of two adjacent pixels of the R image data, the values of sets of two adjacent pixels of the B image data and the values of sets of two adjacent pixels of the R image data forwarded every twelve bits by the reflection type image read-out apparatus 30 to define the average values to single pixels.

Further, the image read-out apparatus 1 conducts a first read-out (preliminary read-out) of the color image recorded in one frame of the film F or in one color print P to generate digital image data and the image processing apparatus 5 uses the image data generated based on the image data generated by the preliminary read-out to set the image read-out conditions for second read-out (main read-out). The main color image read-out is then conducted to generate the final digital image data. The first frame memory unit 51 stores the image data obtained by the first read-out, namely, the preliminary read-out, while the second frame memory unit 52 and the third frame memory unit 53 store the image data obtained by the second read-out, namely, the main read-out.

Figure 6:
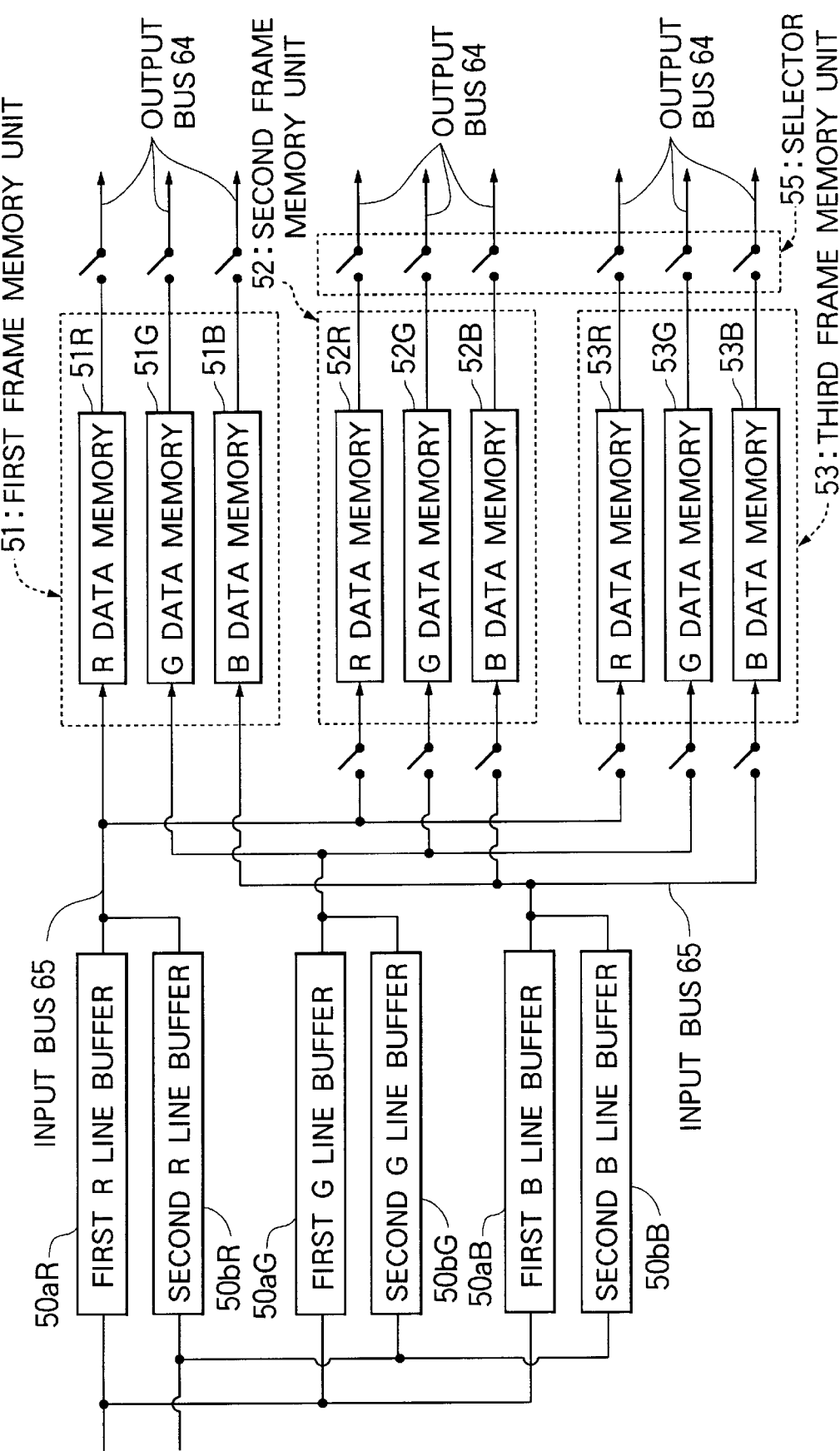
FIG. 6 is a block diagram showing the particulars of a first frame memory unit, a second frame memory unit and a third frame memory unit.

FIG. 6 is a block diagram showing the particulars of the first frame memory unit 51, the second frame memory unit 52 and the third frame memory unit 53.

As shown in FIG. 6, for enabling the image processing apparatus 5 to process the image data generated by color image read-out, the first line buffer 50a and the second line buffer 50b, or the first frame memory unit 51, the second frame memory unit 52 and the third frame memory unit 53 are each provided with R, G and B line buffers or R, G and B data memories for storing image data corresponding to R, G and B components. Specifically, the first line buffer 50a has a first R line buffer 50aR, a first G line buffer 50aG and a first B line buffer 50aB, the second line buffer 50b has a second R line buffer 50bR, a second G line buffer 50bG and a second B line buffer 50bB, the first frame memory unit 51 has an R data memory 51R, a G data memory 51G and a B data memory 51B, the second frame memory unit 52 has an R data memory 52R, a G data memory 52G and a B data memory 52B, and the third frame memory unit 53 has an R data memory 53R, a G data memory 53G and a B data memory 53B. FIG. 6 shows the state during input of image data obtained by the preliminary read-out to the first frame memory unit 51 and output of the image data stored in the second frame memory unit 52.

Format altering means is formed by a CPU 60 for controlling the overall operation of the image processing apparatus 5, the first R line buffer 50aR, the first G line buffer 50aG and the first B line buffer 50aB, the second R line buffer 50bR, the second G line buffer 50bG and the second B line buffer 50bB, the R data memory 51R, the G data memory 51G and the B data memory 51B, the R data memory 52R, the G data memory 52G and the B data memory 52B, and the R data memory 53R, the G data memory 53G and the B data memory 53B for storing the image data of each color forwarded pixel by pixel or line by line by the transmission type image read-out apparatus 10 in the first, second or third frame memory unit 51, 52, 53 adapted to store image data of one frame for each color.

The thus constituted format altering means alters the format of image data in the following manner.

The transmission type image read-out apparatus 10 provided with the CCD area sensor 15 first directs red (R) light onto the film F and generates R image data of one frame of the film F to transfer them to the image processing apparatus 5. It then directs green (G) light onto the film F and generates G image data of one frame of the film F to transfer them to the image processing apparatus 5. The transmission type image read-out apparatus 10 finally directs blue (B) light onto the film F and generates B image data of one frame of the film F to transfer them to the image processing apparatus 5. As a result, in the transmission type image read-out apparatus 10, the generated image data are transferred to the image processing apparatus 5 so that each of the R, G and B image data are transferred frame by frame.

On the other hand, in the reflection type image read-out apparatus 30 provided with the CCD line sensor 35, the CCD line sensor 35 including three line sensors corresponding to three colors of R, G and B is moved over the color image recorded on the color print P and the like and a color image is read while it generates image data corresponding to R, G and B and progressively transfers the generated image data to the image processing apparatus 5. Therefore, the reflection type image read-out apparatus 30 can transfer the generated image data to the image processing apparatus 5 with each of R, G and B image data pixel by pixel in such a manner that R image data of a first pixel, G image data of the first pixel and B image data of the first pixel are first transferred and R image data of a second pixel, G image data of the second pixel and B image data of the second pixel are then transferred, or can transfer the generated image data to the image processing apparatus 5 with each of R, G and B image data line by line in such a manner that R image data of a first line, G image data of the first line and B image data of the first line are first transferred and R image data of a second line, G image data of the second line and B image data of the second line are then transferred. In this embodiment, the reflection type image read-out apparatus 30 is constituted so as to transfer the generated image data to the image processing apparatus 5 pixel by pixel.

In the image processing apparatus 5, the image data are stored frame by frame in the first frame memory unit 51, the second frame memory unit 52 or the third frame memory unit 53. The first frame memory unit 51 includes the R data memory 51R, the G data memory 51G and the B data memory 51B for respectively storing the image data corresponding to R, G and B, the second frame memory unit 52 includes the R data memory 52R, the G data memory 52G and the B data memory 52B for respectively storing the image data corresponding to R, G and B, and the third frame memory unit 53 includes the R data memory 53R, the G data memory 53G and the B data memory 53B for respectively storing the image data corresponding to R, G and B. The R, G and B image data are stored in the R data memory 51R, the G data memory 51G and the B data memory 51B, the R data memory 52R, the G data memory 52G and the B data memory 52B or the R data memory 53R, the G data memory 53G and the B data memory 53B in accordance with color. Accordingly, it is possible to successively store the image data progressively forwarded from the reflection type image read-out apparatus 10 as sets of the R, G and B image data frame by frame in the R data memory 51R, the G data memory 51G and the B data memory 51B of the first frame memory unit 51, the R data memory 52R, the G data memory 52G and the B data memory 52B of the second frame memory unit 52 or the R data memory 53R, the G data memory 53G and the B data memory 53B of the third frame memory unit 53.

On the other hand, in the reflection type image read-out apparatus 30, since the R image data, the G image data and the B image data are continuously transferred pixel by pixel to the image data processing apparatus 5 in such a manner that the R image data of a first pixel, the G image data of the first pixel and the B image data of the first pixel are first transferred and the R image data of a second pixel, the G image data of the second pixel and the B image data of the second pixel are then transferred, it is necessary to selectively store the R image data, the G image data and the B image data in the corresponding R data memory, G data memory and B data memory.

Therefore, in the image processing apparatus 5, when the image data forwarded from the reflection type image read-out apparatus 30 are stored in, for example, the second frame memory unit 52, the CPU 60 controls the three data memories 52R, 52G, 52B and selectively and progressively stores the R. G and B image data forwarded pixel by pixel in the R data memory 52R, the G data memory 52G and the B data memory 52B in such a manner that the R image data of a first pixel first forwarded are stored in the R data memory 52R, the G image data of the first pixel next forwarded are stored in the G data memory 52G, the B image data of the first pixel third forwarded are stored in the B data memory 52B, the R image data of a second pixel fourth forwarded are stored in the R data memory 52R, the G image data of the second pixel fifth forwarded are stored in the G data memory 52G, the B image data of the second pixel sixth forwarded are stored in the B data memory 52B and so on.

Further, in this embodiment, since each memory unit is constituted by a DRAM, refresh operation is necessary. On the other hand, the image data are forwarded independently of the refresh operation of each memory unit. Therefore, each memory unit cannot store the image data therein during the refresh operation thereof. In view of this, in this embodiment, the first line buffer 50a and the second line buffer 50b are provided upstream of the first frame memory unit 51, the second frame memory unit 52 and the third frame memory unit 53 and after they have temporarily stored the image data, the image data are stored in the first frame memory unit 51, the second frame memory unit 52 or the third frame memory unit 53, whereby the image data forwarded independently of the refresh operation of each memory unit can be stored in the first frame memory unit 51, the second frame memory unit 52 or the third frame memory unit 53.

The first line buffer 50a and the second line buffer 50b are controlled by the CPU 60 and are configured to alternately store the transferred image data. The first line buffer 50a includes a first R line buffer 50aR, a first G line buffer 50aG and a first B line buffer 50aB, and the second line buffer 50b includes a second R line buffer 50bR, a second G line buffer 50bG and a second B line buffer 50bB. The R image data are alternately stored in the first R line buffer 50aR and the second R line buffer 50bR, the G image data are alternately stored in the first G line buffer 50aG and the second G line buffer 50bG and the B image data are alternately stored in the first B line buffer 50aB and the second B line buffer 50bB.

Therefore, when the image data forwarded from the reflection type image read-out apparatus 30 are stored in, for example, the second frame memory unit 52, the CPU 60 controls the six line buffers provided upstream of of the first frame memory unit 51, the second frame memory unit 52 and the third frame memory unit 53 and selectively and progressively stores the R, G and B image data in the first R line buffer 50aR, the first G line buffer 50aG, the first B line buffer 50aB, the second R line buffer 50bR, the second G line buffer 50bG and the second B line buffer 50bB in such a manner that the R image data of a first pixel first forwarded are stored in the first R line buffer 50aR, the G image data of the first pixel next forwarded are stored in the first G line buffer 50aG, the B image data of the first pixel third forwarded are stored in the first B line buffer 50aB, the R image data of a second pixel fourth forwarded are stored in the second R line buffer 50bR, the G image data of the second pixel fifth forwarded are stored in the second G line buffer 50bG, the B image data of the second pixel sixth forwarded are stored in the second B line buffer 50bB, the R image data of a second pixel seventh forwarded are stored in the first R line buffer 50aR, the G image data of the first pixel eighth forwarded are stored in the first G line buffer 50aG, and so on.

The CPU 60 for controlling the overall operation of the image processing apparatus 5 can communicate with the CPU 26 for controlling the transmission type image read-out apparatus 10 or the CPU 46 for controlling the reflection type image read-out apparatus 30 via communication lines (not shown). It can also communicate via a communication line (not shown) with the CPU of the image output apparatus 8 described later. Based on the image data obtained by the preliminary read-out and stored in the first frame memory unit 51, the CPU 60 can adjust the image read-out conditions for the main read-out of the color image and if necessary, can also adjust the image processing conditions. Specifically, the CPU 60 decides the read-out conditions for the main read-out based on the image data obtained by the preliminary read-out so as to enable efficient utilization of the dynamic range of the CCD area sensor 15 or the CCD line sensor 35 at the time of the main read-out and outputs a read-out control signal to the CPU 26 of the transmission type image read-out apparatus 10 or the CPU 46 of the reflection type image read-out apparatus 30. Upon receiving the read-out control signal, the CPU 26 of the transmission type image read-out apparatus 10 or the CPU 46 of the reflection type image read-out apparatus 30 controls the quantity of light passage regulated by the light regulating unit 12 or the light regulating unit 34 and further controls the storage time of the CCD area sensor 15 or the CCD line sensor 35. As required, the CPU 60 at the same time outputs to first image processing means and second image processing means described later a control signal based on the obtained image data so as to adjust the image processing parameters and other image processing conditions of the first image processing means and the second image processing means to enable reproduction on color photographic paper of a color image having optimum density, gradation and tone.

Since the image data obtained by the first image read-out, namely, the preliminary read-out, is used solely for deciding the read-out conditions and the image processing conditions for the second image read-out, namely, the main read-out, it does not have to be large volume. As explained in more detail later, moreover, in this embodiment, the image processing apparatus enables the operator to reproduce a color image based on the image data obtained by the preliminary read-out on a CRT and to set the image processing conditions while observing the reproduced color image. The image processing apparatus reduces the volume of the image data obtained by the preliminary read-out to a level enabling reproduction of a color image on a CRT and stores the reduced image data in the first frame memory unit 51. To achieve this data reduction, the image read-out apparatus 1 is configured so that the CCD area sensor 15 of the transmission type image read-out apparatus 10 reads only odd fields or even fields of the image data during the preliminary read-out and that the speed of the light source 31 and the mirror 32 of the reflection type image read-out apparatus 30, i.e., the sub-scanning speed, is doubled during the preliminary read-out, thereby reducing the volume of the read-out image data to half. In addition, the image processing apparatus 5 is configured so that the arithmetic average computing means 49 sums and averages the values of sets of two adjacent pixels of the received image data and defines the average values as single pixels, thereby reducing the number of pixels per line of the image data to ½, and that only pixels of one of the odd lines and the even lines of the image data are stored alternately in the first line buffer 50a and the second line buffer 50b and only the image data stored in one of the first line buffer 50a and the second line buffer 50b are stored in the first frame memory unit 51, thereby reducing the number of pixels of the image data stored in the first frame memory unit 51 to ⅟16. Since the number of pixels of the image data obtained by the preliminary read-out is reduced, while the second frame memory unit 52 and the third frame memory unit 53 for storing image data obtained by the main read-out have capacities enabling them to store the image data obtained by read-out of a color image recorded in one frame of the negative, reversal or other such film F or a color image recorded in one color print P, the first frame memory unit 51 for storing the image data obtained by the preliminary read-out has a much smaller capacity than the second frame memory unit 52 and the third frame memory unit 53.

The image processing apparatus 5 is further provided with first image processing means 61 adapted to enable a color image to be reproduced on color photographic paper with the desired density, gradation and tone by subjecting the image data stored in the second frame memory unit 52 and the third frame memory unit 53 to gradation correction, color conversion, density conversion and other such image processing by use of lookup tables or matrix computation, and second image processing means 62 adapted to enable a color image to be reproduced on the screen of a CRT explained later with the desired picture quality by subjecting the image data stored in the first frame memory unit 51 to gradation correction, color conversion, density conversion and other such image processing by use of lookup tables or matrix computation. A selector 55 selects the output of either the second frame memory unit 52 or the third frame memory unit 53 so as to input the image data stored in one or the other of the second frame memory unit 52 and the third frame memory unit 53 to the first image processing means 61.

The first frame memory unit 51, second frame memory unit 52 and third frame memory unit 53 are connected to an input bus 63 and an output bus 64. The image processing apparatus further has a data bus 65 to which are connected the CPU 60 for overall control of the color image reproducing system, a memory 66 for storing an operating program executed by the CPU 60, a hard disk 67 for storing image data, a CRT 68, a keyboard 69, a communication port 70 for connection with another color image reproducing system via a communication line, and communication lines to the CPU of the transmission type image read-out apparatus 10 and the CPU 46 of the reflection type image read-out apparatus 30.

The first image processing means 61 is connected to data synthesizing means 75 and the data synthesizing means 75 is connected with a merge data memory 76. The merge data memory 76 has an R data memory 76R, a G data memory 76G and a B data memory 76B for storing data corresponding to the R, G and B components of graphics, characters or the like. The image data relating to graphics, characters and the like stored in the merge data memory 76 can be synthesized with the image data obtained by reading out a color image recorded on a film F or a color print P, thereby enabling the image output apparatus 8 explained later to reproduce a composite color image based on the two types of image data. The data synthesizing means 75 is connected with an interface 77.

Figure 7:
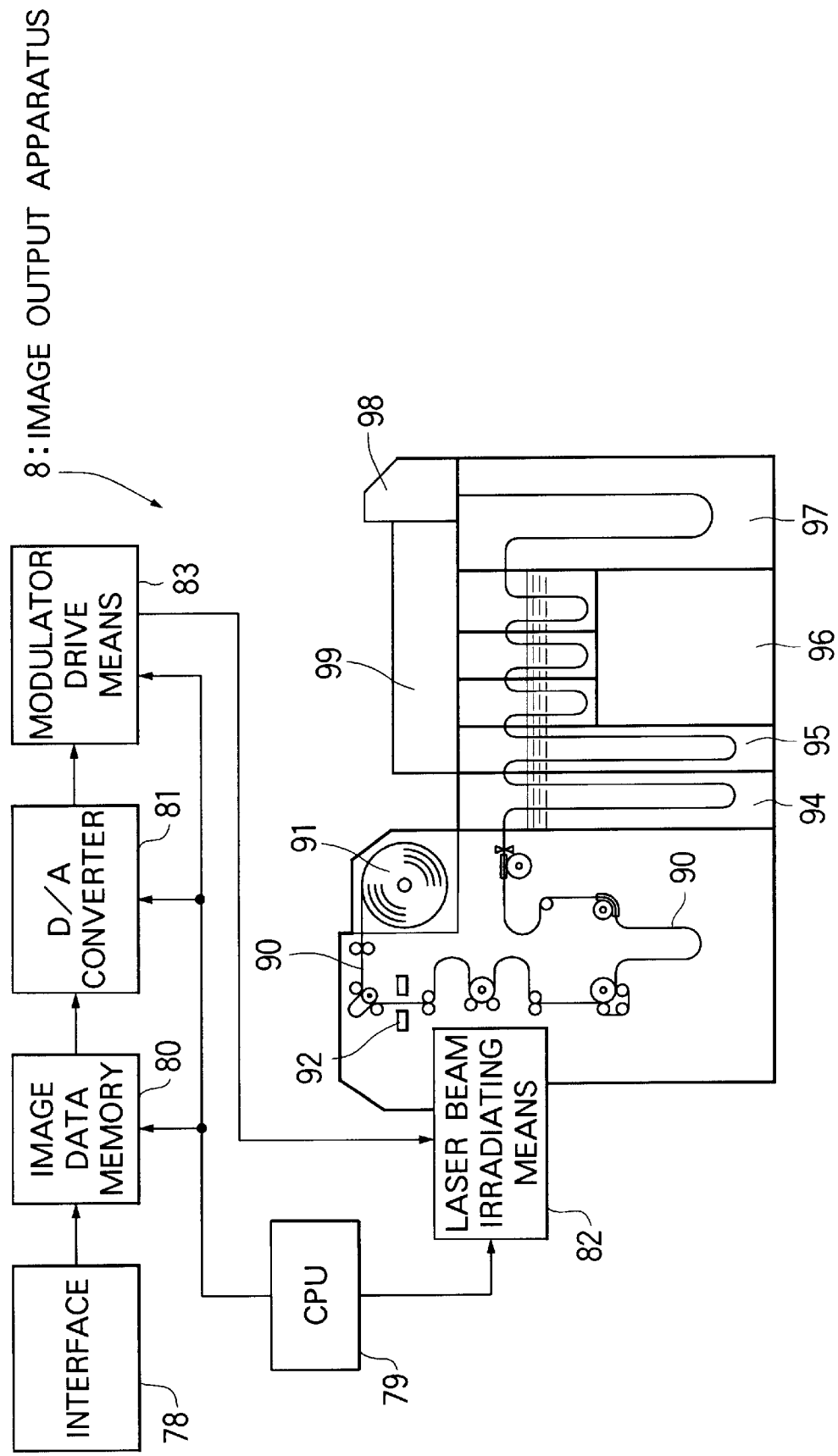
FIG. 7 is a schematic view of an image output apparatus for a color image reproducing system, which reproduces color images on color photographic paper based on image data read out by an image read-out apparatus which is an embodiment of the present invention.

FIG. 7 is a schematic view of an image output apparatus for a color image reproducing system which reproduces color images on a color photographic paper based on image data processed by the image processing apparatus 5.

As shown in FIG. 7, the image output apparatus 8 includes an interface 78 connectable with the interface 77 of the image processing apparatus 5, a CPU 79 for controlling the image output apparatus 8, an image data memory 80 consisting of multiple frame memories for storing image data input from the image processing apparatus 8, a D/A converter 81 for converting the image data into an analog signal, laser beam irradiating means 82 and modulator drive means 83 for outputting modulation signals for modulating the intensities of the laser beams produced by the laser beam irradiating means 82. The CPU 79 can communicate with the CPU 60 of the image processing apparatus 5 via a communication line (not shown).

Figure 8:
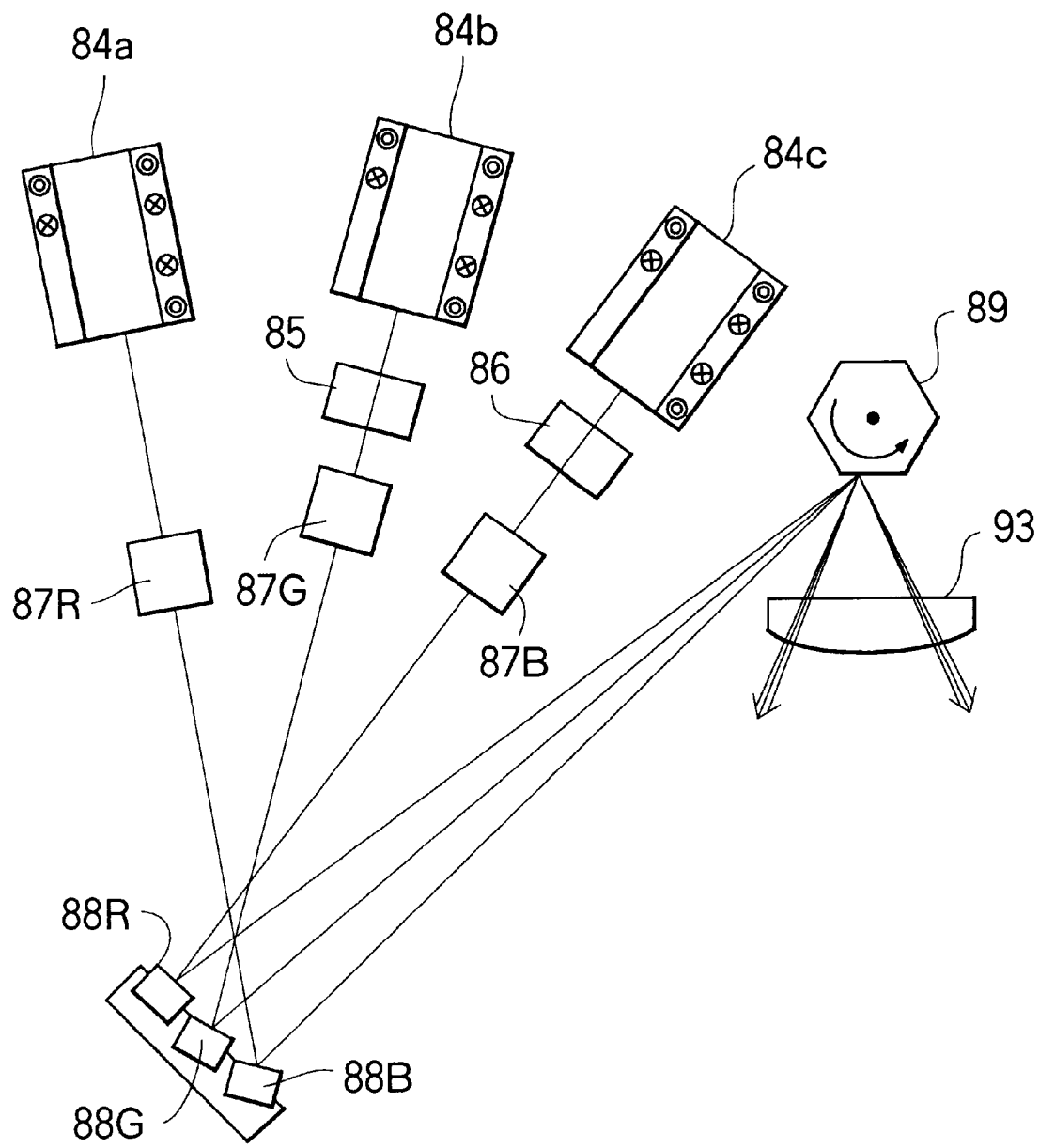
FIG. 8 is a schematic view of laser beam irradiating means of the image output apparatus.

FIG. 8 is a schematic view of the laser beam irradiating means 82. The laser beam irradiating means 82 has semiconductor laser beam sources 84a, 84b, 84c for producing red laser beams. The laser beam emitted by the semiconductor laser beam source 84b is converted to a green laser beam by wavelength converting means 85 and the laser beam emitted by the semiconductor laser beam source 84c is converted to a blue laser beam by wavelength converting means 86. The red laser beam emitted by the laser beam source 84a, the green laser beam wavelength-converted by the wavelength converting means 85 and the blue laser beam wavelength-converted by the wavelength converting means 86 enter light modulators 87R, 87G, 87B, which can be acousto-optic modulators (AOMs) or the like. The light modulators 87R, 87G, 87B are each input with a modulation signal from the modulator drive means 83 and modulate the intensities of the laser beams in accordance with the modulation signals. The laser beams modulated in intensity by the light modulators 87R, 87G, 87B are reflected onto a polygonal mirror 89 by reflecting mirrors 88R, 88G, 88B.

The image output apparatus 8 is equipped with a magazine 91 for accommodating a roll of web-like color photographic paper 90 which is conveyed along a prescribed conveyance path running in the sub-scanning direction. Perforating means 92 is installed on the conveyance path of the color photographic paper 90 for perforating reference holes in the edge of the color photographic paper 90 at intervals corresponding to the length of the individual color prints. The reference holes are used for synchronizing the conveyance of the color photographic paper 90 with the operation of other means of the image output apparatus 8 so that a prescribed portion of the color photographic paper 90 is exposed by the laser irradiating means 82 as described later.

The laser beams modulated by the light modulators 87R, 87G, 87B are deflected by the polygonal mirror 89, pass through an f θ lens 93 and expose the whole surface of the color photographic paper 90 by scanning it in the main scanning direction while it is being conveyed in the sub-scanning direction. The CPU 79 controls the conveyance speed of the color photographic paper 90 in the sub-scanning direction to synchronize it with the rotational speed of the main scanning direction, i.e., with the rotational speed of the polygonal mirror 89.

The color photographic paper 90 exposed by the laser beams is forwarded to a developing section having a color developing tank 94, a bleach-fixing tank 95 and a washing tank 96, where it is subjected to prescribed color development, bleach-fixing and washing, thereby reproducing on the color photographic paper 90 one or more color images based on the image data image-processed by the image processing apparatus 5. The color photographic paper 90 is then sent to a drying section 97 where it is dried, to a cutter 98 controlled based on the reference holes perforated in the edge of the color photographic paper 90 to operate synchronously with the conveyance of the color photographic paper 90 so as to cut it into lengths each corresponding to the length of one image recorded in one frame of the film F or one color print P, and to a sorter 99 which sorts the cut pieces based on the individual rolls of the film F or by customer.

The color developing tank 94, the bleach-fixing tank 95, the washing tank 96, the drying section 97, the cutter 98 and the sorter 99 can be of the same type as used in an ordinary automatic developing machine.

Figure 9:
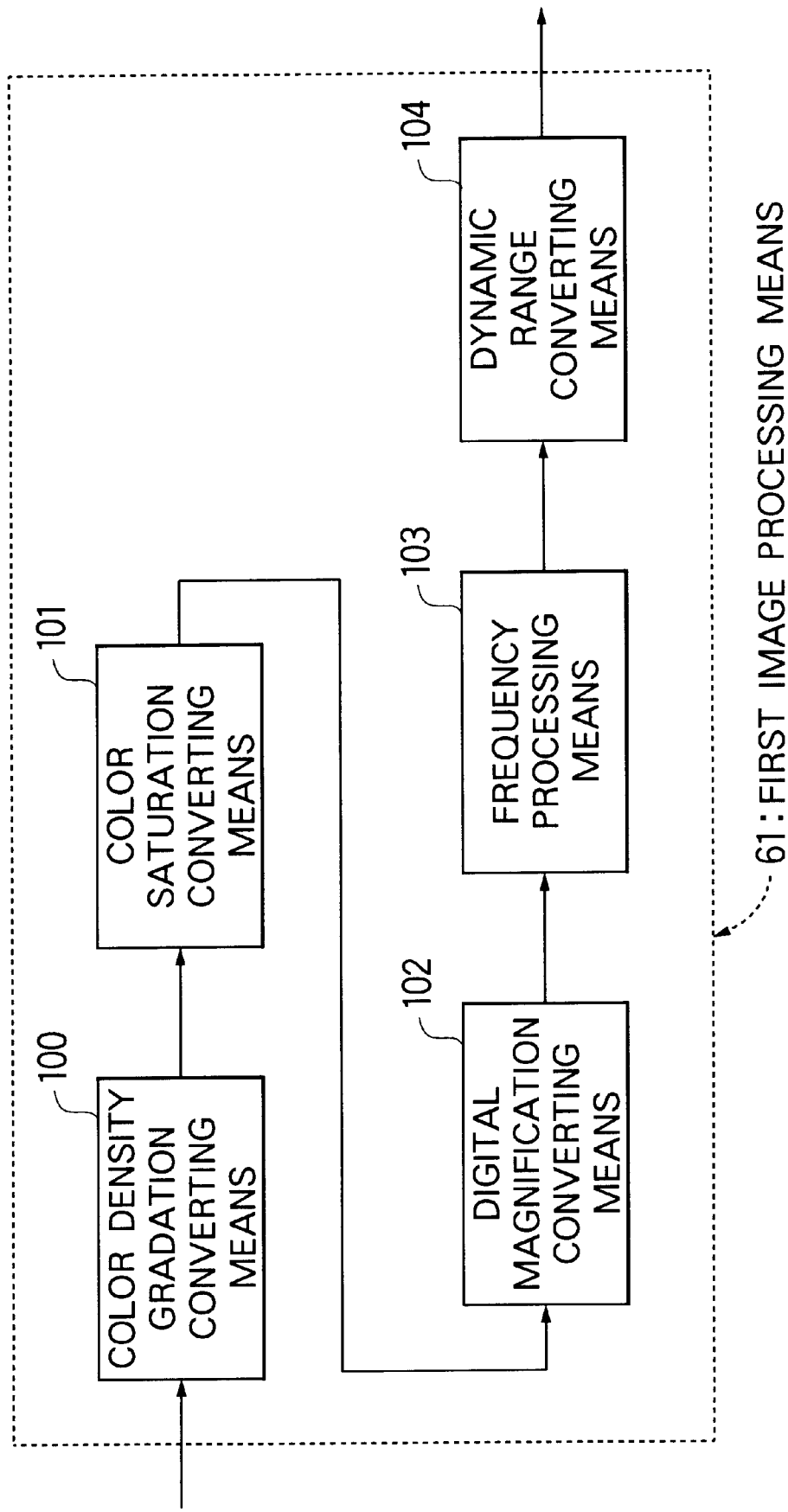
FIG. 9 is a block diagram showing the particulars of first image processing means.

FIG. 9 is a block diagram showing the particulars of the first image processing means 61. As shown in FIG. 9, the first image processing means 61 comprises color density gradation converting means 100 for converting the color signal level, density signal level and gradation signal level of the input image data, color saturation converting means 101 for converting color saturation data of the image data, digital magnification converting means 102 for converting the number of pixels of the image data, frequency processing means 103 for frequency-processing the image data and dynamic range converting means 104 for converting the dynamic range of the image data.

Figure 10:
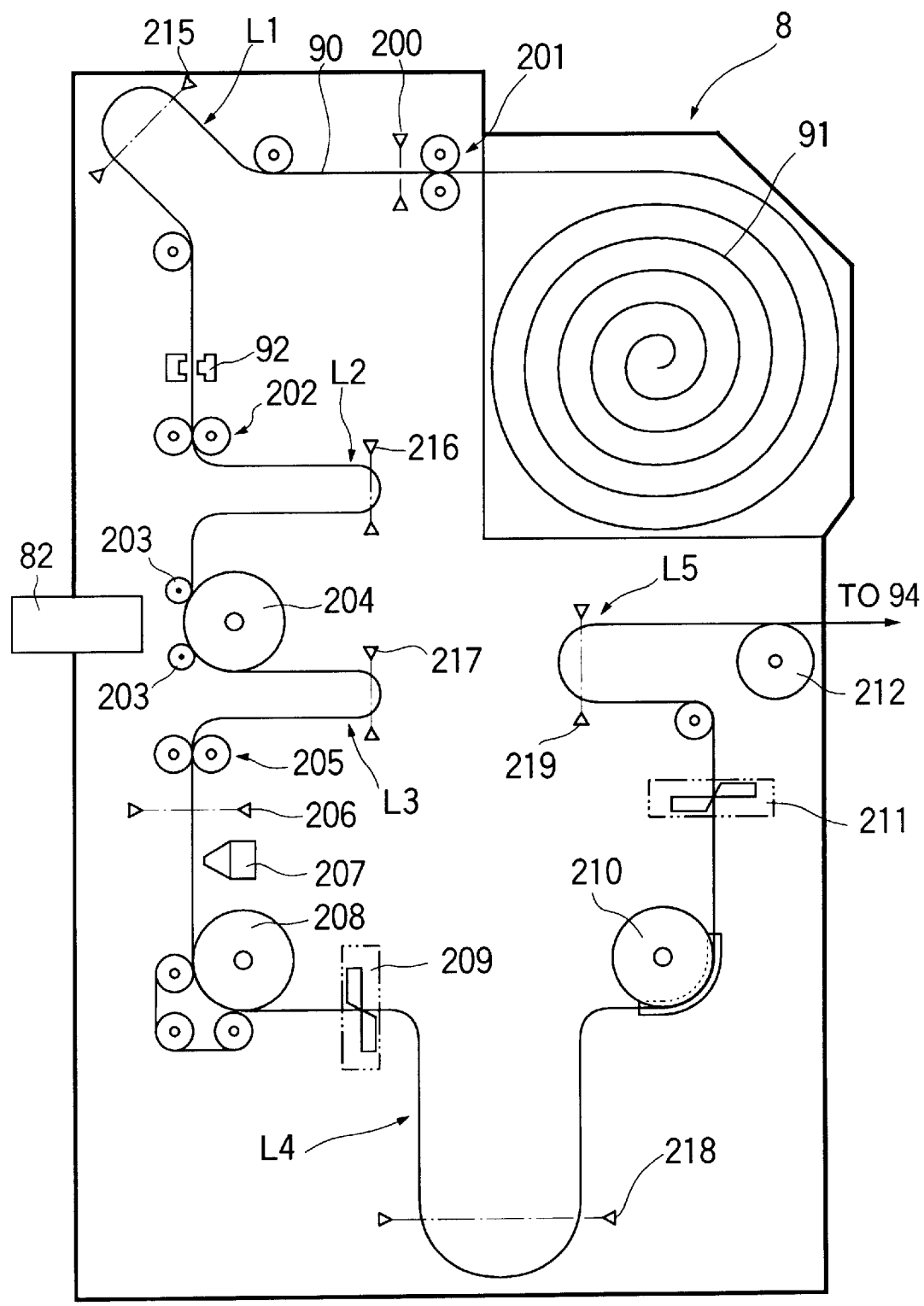
FIG. 10 is a schematic view showing the particulars of an image output apparatus upstream of a color development tank.

FIG. 10 is a schematic view showing the particulars of an image output apparatus 8 upstream of a color developing tank 94. As shown in FIG. 10, the image output apparatus 8 is provided along the conveyance path of the web-like color photographic paper 90 with a first conveyance roller pair 201, a first sensor 200, the perforating means 92, a second conveyance roller pair 202 intermittently driven by a step motor (not shown), a third conveyance roller pair 203, a drum 204, a fourth conveyance roller pair 205 intermittently driven by a step motor (not shown), a second sensor 206, printing means 207 for printing the back surface of the color photographic paper 90, a fifth conveyance roller 208 intermittently driven by the step motor for driving the fourth roller pair 205, a first cutter 209 for cutting the color photographic paper 90, a sixth conveyance roller 210 driven by a constant speed motor (not shown), a second cutter 211 for cutting the color photographic paper 90 at different timing from the first cutter 209, and a seventh conveyance roller 212 for feeding the color photographic paper 90 into the color developing tank 94.

Each of the first sensor 200 and the second sensor 206 is constituted by a photosensor including a light emitting element and a light receiving element.

The conveyance roller pairs 201, 202, 203, 205, the drum 204 and the conveyance rollers 208, 210, 212 are configured to be nonsynchronously rotated at different timings and speed to convey the web-like color photographic paper 90 when it is exposed based on the image data. For absorbing these differences in the rotation timings and speed, loops of the color photographic paper 90 can be formed between the conveyance roller pair 201 and the conveyance roller pair 202, the conveyance roller pair 202 and one of the conveyance roller pair 203, the other of the conveyance roller pair 203 and the conveyance roller pair 205, the conveyance roller 208 and the conveyance roller 210, and the conveyance roller 210 and the conveyance roller 212.

More specifically, when the reference hole is perforated in the edge of the color photographic paper 90 by the perforating means 92, the rotation of the second conveyance roller pair 202 is temporarily stopped and when the reference hole has been perforated, the second conveyance roller pair 202 is again rotated to convey the color photographic paper 90. As a result, the second conveyance roller pair intermittently conveys the color photographic paper 90. To the contrary, the color photographic paper 90 accommodated in the magazine 91 is drawn out therefrom by the first conveyance roller pair 201 at a constant speed. Therefore, since the rotation timings and speed do not agree between the first conveyance roller pair 201 and the second conveyance roller pair 202, this image output apparatus 8 is configured so as to form a first loop L1 of the color photographic paper 90 between the first conveyance roller pair 201 and the perforating means 92 to compensate for the differences in the conveyance timings and conveyance speed caused between the first conveyance roller pair 201 and the second conveyance roller pair 202. The presence and size of the first loop L1 can be detected by a sensor 215 for the first loop L1.

The exposure section further includes the third conveyance roller pair 203 and the drum 204 and the web-like color photographic paper 90 is exposed to a laser beam from the laser irradiating means 82, while it is being held between the drum 204 and the third conveyance roller pair 203 and conveyed in the sub-scanning direction. Therefore, the image output apparatus 8 is configured so as to form a second loop L2 of the web-like color photographic paper 90 between the second conveyance roller pair 202, and the third conveyance roller pair 203 and the drum 204 to compensate for differences in the conveyance timings and speed of the color photographic paper 90 caused between the second conveyance roller pair 202 for intermittently conveying the color photographic paper 90 and the third conveyance roller pair 203 and the drum for conveying the color photographic paper 90 at a constant speed during the exposure of the color photographic paper 90. The presence and size of the second loop L2 can be detected by a sensor 216 for the second loop L2.

The back surface of the color photographic paper 90 exposed to the laser beam from the laser irradiating means 82 is printed with exposure conditions and the like by the printing means 207. At this time, the color photographic paper 90 is intermittently conveyed by the fourth conveyance roller pair 205 and the fifth conveyance roller 208 driven by the common step motor (not shown). Therefore, the image output apparatus 8 is configured so as to form a third loop L3 of the web-like color photographic paper 90 between the third conveyance roller pair 203 and drum 204 and the fourth conveyance roller pair 205 to compensate for differences in the conveyance timings and speed caused between the third conveyance roller pair 203 and drum 204 for conveying the color photographic paper 90 at a constant speed during the exposure of the color photographic paper 90 and the fourth conveyance roller pair 205 and fifth conveyance roller 208 for intermittently conveying the color photographic paper 90. The presence and size of the third loop L3 can be detected by a sensor 217 for the third loop L3.

The image output apparatus 8 is further configured so as to form a fourth loop L4 (a reservoir section) of the web-like color photographic paper 90 between the fifth conveyance roller 208 and the sixth conveyance roller 210 to compensate for differences in the conveyance timings and speed caused between the conveyance means upstream of the color developing tank 94, such as the fourth conveyance roller pair 205 and the fifth conveyance roller 208, for synchronously and intermittently conveying the color photographic paper 90 and the like, and the conveyance mechanism downstream of the color developing tank 94 for conveying the color photographic paper 90 at a constant speed to be subjected to development and the like. The presence and size of the fourth loop L4 can be detected by a sensor 218 for the fourth loop L4. The fourth loop L4 also serves to delay the feeding of the exposed color photographic paper 90 into the color developing tank 94 so as to stabilize the latent image formed on the color photographic paper 90.

In the image output apparatus 8, in the case where the speed of conveying the color photographic paper 90 by the sixth conveyance roller 210 becomes smaller than that of the fifth conveyance roller 208 and the size of the fourth loop L4 becomes greater than a prescribed size, the second cutter 211 is actuated to cut the web-like color photographic paper 90 to ensure that the color photographic paper 90 can be smoothly fed into the color developing tank 94. Further, when the length of the color photographic paper 90 which has been continuously fed into the color developing tank 94 exceeds a prescribed length, for example, eight meters, the second cutter 211 is actuated to cut the web-like color photographic paper 90. The image output apparatus 8 is further configured so as to form a fifth loop L5 of the color photographic paper 90 between the second cutter 211 and the seventh conveyance roller 212 for enabling the color photographic paper 90 to be fed into the color developing tank 94 while the second cutter 211 is being actuated. The presence and size of the fifth loop L5 can be detected by a sensor 219 for the fifth loop L5. The fifth loop L5 also serves to compensate for differences in the conveyance timings and speed caused between the sixth conveyance roller 210 and the seventh conveyance roller 212 or the conveyance mechanism of the color photographic paper 90 downstream of the color developing tank 94.

The color image reproducing system including the image read-out apparatus which is an embodiment of the present invention is configured so that when the reproduction of color images recorded on one unit (lot) of a negative film, reversal film or color prints such as the processing of one film or the processing of a prescribed number of color prints requested by a customer has been completed, the reproduction operation of color images is once stopped, the exposed color photographic paper 90 is cut by the first cutter 209 and developed to produce color prints.

More specifically, when an instruction to temporarily stop the processing is input through the keyboard 69 by the operator, the color photographic paper 90 is conveyed without being exposed until a portion of the color photographic paper 90 exposed based on the final image data has been passed through the first cutter 209. When the portion of the color photographic paper 90 exposed based on the final image data has been passed through the first cutter 209, the web-like color photographic paper 90 is cut by the first cutter 209 and only the exposed color photographic paper 90 is fed into the color developing tank 94, the bleach-fixing tank 95 and the washing tank 96 to be quickly discharged from the image output apparatus 8. Thereafter, the operation of reproducing color images is temporarily stopped.

The thus constituted color image reproducing system including the transmission type image read-out apparatus 10 which is an embodiment of the present invention, the reflection type image read-out apparatus 30, the image processing apparatus 5 and the image output apparatus 8 reads a color image recorded on a film F or a color print P, generates image data, effects image processing on the image data and reproduces a color image on a color photographic paper 90 in following manner.

In the case of reproducing a color image recorded on a negative, reversal or other such film F, the transmission type image read-out apparatus 10 is connected through its interface 21 with the interface 48 of the image processing apparatus 5 and the film F is set in the carrier 22. When the film F has been set in the carrier 22, the CPU 60 outputs a drive signal to the motor 23 and the motor 23 drives the rollers 24. As result, the film F is conveyed in the direction of the arrow. The picture region detection sensor 25 detects the density distribution of the film F and outputs the result of the detection to the CPU 26 as a density signal. Based on this density signal, the CPU 26 detects the picture position of the color image and when it finds that the picture of the color image has reached the prescribed position, it stops the motor 23. As a result, the color image recorded on the film F is stopped at a prescribed picture position relative to the CCD area sensor 15 and the lens 16. The light source 11 then emits light at a prescribed time thereafter and the light regulating unit 12 regulates the quantity of the light passed in the direction of the film F. In this embodiment, the color image recorded in a single frame of the film F is read out twice. The image data obtained by the first read-out (preliminary read-out) are used as a basis for deciding the image read-out conditions in the second read-out (main read-out). Specifically, the main read-out is conducted after adjustment of the quantity of light directed onto the film F by the light regulating unit 12 and the adjustment of the storage time of the CCD area sensor 15. Therefore, in the preliminary read-out, the light emitted from the light source 11 is adjusted to a prescribed quantity by the light regulating unit 12 and then separated into three colors, R, G and B, by the color separation unit 13. The film F is first irradiated with R light, then with G light and finally B light. The light transmitted through the film F is photoelectrically read by the CCD area sensor 15.

The image data generated by reading-out the color image by the CCD area sensor 15 and corresponding to one field are amplified by the amplifier 17 and converted to digital signals by the A/D converter 18. The image data converted to digital signals are corrected for dark current and variance in sensitivity among the individual pixels by the CCD correcting means 19 and then converted to density data by the logarithmic converter 20, whereafter only the image data corresponding to an odd field or an even field are sent line by line to the image processing apparatus 5 through the interface 21 and the interface 48.

On the other hand, in the case of reproducing a color image recorded on a color print P, the reflection type image read-out apparatus 30 is connected through its interface 41 with the interface 48 of the image processing apparatus 5 and the color print P is set in the carrier 42. Light emitted by the light source 31 is reflected from the surface of the color print P, is reflected by the mirror 32, passes through the color balance filter 33, which adjusts its R, G, B sensitivity, and is adjusted in quantity by the light regulating unit 34. Similarly to what was explained earlier, in the preliminary read-out, light emitted by the light source 31 is regulated to a prescribed quantity by the light regulating unit 34 and is received and photoelectrically read by the CCD line sensor 35 constituted by three line sensors corresponding to R, G, B. At this time, the light source 31 and the mirror 32 are moved at a prescribed speed in the direction of the arrow, i.e., the sub-scanning direction, by a drive means (not shown). As a result, the color image recorded on the color print P held in the carrier (not shown) is two dimensionally read out and the CCD line sensor 35 generates image data corresponding to R, G, B. Since the speed of the light source 31 and the mirror 32 during the preliminary read-out is set to be greater than during the main read-out.

R image data, G image data and B image data corresponding to R, G, B generated by the CCD line sensor 35 are amplified by the amplifier 37 and converted to digital signals by the A/D converter 38. The image data converted to digital signals are corrected for dark current and variance in sensitivity among the individual pixels by the CCD correcting means 39 and then converted to density data by the logarithmic converter 40, whereafter the image data are sent pixel by pixel to the image processing apparatus 5 through the interface 41 and the interface 48.

Upon receiving image data from the transmission type image read-out apparatus 10 or the reflection type image read-out apparatus 30, the image processing apparatus 5, specifically the arithmetic average computing means 49 thereof, sums and averages the values of sets of four adjacent pixels of the image data received line by line and defines the average values as single pixels, thereby reducing the number of pixels per line of the image data to ¼, whereafter the lines are stored alternately in the first line buffer 50a and the second line buffer 50b. During the preliminary read-out, the CPU 60 connects only the first frame memory unit 51 to the input bus 63 and disconnects the second frame memory unit 52 and the third frame memory unit 53 from the input bus 63. As a result, only the image data stored in one of the line buffers 50a, 50b are progressively transferred line by line to the first frame memory unit 51 as the preliminary read-out image data. In this way, the number of pixels corresponding to the color image recorded in one frame of film F or one color print P is reduced to ¹⁄₁₆ and the pixels are stored in the R data memory 51R, the G data memory 51G and the B data memory 51B of the first frame memory unit 51 as image data corresponding to R, G, B, respectively.

The image data obtained by the preliminary read-out and stored in the first frame memory unit 51 are forwarded through the data bus 65 to the CPU 60 for analysis. Based on the image data obtained by the preliminary read-out, the CPU 60 generates a read-out control signal for optimally conducting the main read-out in light of the dynamic range of the CCD area sensor 15 or the CCD line sensor 35 and forwards the read-out control signal through the data bus 65 to the CPU 26 of the transmission type image read-out apparatus 10 or the CPU 46 of the reflection type image read-out apparatus 30. In addition, the CPU 60 automatically decides the main read-out conditions for enabling an image of optimum density, gradation and tone to be reproduced on the color photographic paper 90 based on the image data obtained by the main read-out.

Based on the read-out control signal received from the CPU 60, the CPU 26 of the transmission type image read-out apparatus 10 or the CPU 46 of the reflection type image read-out apparatus 30 controls the light regulating unit 12 or the light regulating unit 34 during the main read-out so that the film F is irradiated with the prescribed quantity of light or the CCD line sensor 35 receives the prescribed quantity of light from the color print P. The CPU 26 or the CPU 46 also adjusts the storage time of the CCD area sensor 15 or the CCD line sensor 35.

If required, the CPU 60 at the same time forwards control signals through the data bus 65 to the first image processing means 61 and the second image processing means 62 so as to adjust the image processing parameters and other image processing conditions in line with the results of the analysis of the image data read out in the preliminary read-out.

Further, the image data obtained by the preliminary read-out and stored in the first frame memory unit 51 are sent to the second image processing means 62, which subjects them to gradation correction, color conversion, density conversion, and are then sent through the data bus 65 to the CRT 68 to display a color image on the screen of the CRT 68.

Upon viewing the color image displayed on the screen of the CRT 68, the operator can, if necessary, use the keyboard 69 to adjust the image read-out conditions for the main read-out and/or the image processing conditions. When the operator uses the keyboard 69 to input an instruction signal to adjust the image read-out conditions and/or the image processing conditions for the main read-out, the instruction signal from the keyboard 69 is input to the CPU 60 through the data bus 65. Based on the instruction signal, the CPU 60 generates a control signal which it sends through the data bus 65 to the CPU 26 of the transmission type image read-out apparatus 10 or the CPU 46 of the reflection type image read-out apparatus 30, and/or the first image processing means 61, and/or the second image processing means 62 so as to adjust the image read-out conditions and/or the image processing conditions. In the present embodiment, since the data bus is formed independently of the input and output buses 63, 64 of the first frame memory unit 51, the second frame memory unit 52 and the third frame memory unit 53, the operator can input various instruction signals or display a color image on the screen of the CRT 68 even during input or output of image data to or from the first memory unit 51, the second frame memory unit 52 or the third frame memory unit 53.

Once the image read-out conditions and/or the image processing conditions for the main read-out have been decided from the results of the preliminary read-out, the main read-out is conducted. In the main read-out, the CCD area sensor 15 of the transmission type image read-out apparatus 10 generates an odd field and an even field of the image data of the color image recorded in one frame of the film F or the CCD line sensor 35 of the reflection type image read-out apparatus 30 reads the color image recorded on a single color print P at a low sub-scanning speed to generate image data which are input line by line to the image processing apparatus 5 through the interface 21 or the interface 41 and the interface 48.

In this embodiment, the spectral sensitivity of the CCD area sensor 15 used in the transmission type image read-out apparatus 10 is set so that the peak of spectral sensitivity for green (G) light thereof agrees with the peak of spectral sensitivity for green (G) light of a color photographic paper to be used for reproducing a color image recorded on a negative film, that the peak of spectral sensitivity for red (R) light of the CCD area sensor is located on the side of shorter wavelength than the spectral absorption peak of cyan dye of the negative film and on the side of longer wavelength than the spectral absorption peak of cyan dye of the reversal film and that the peak of spectral sensitivity for blue (B) light thereof does not agree with the spectral absorption peak of yellow dye of the negative film. Since the spectral absorption characteristics of magenta dye of a negative film and the spectral absorption characteristics of magenta dye of a reversal film are very similar, the peak of the spectral sensitivity for green (G) light of the CCD area sensor 15 can be made to agree with that of a color photographic paper 90. On the other hand, since the spectral absorption peak of cyan dye of a negative film is located on the side of longer wavelength than that of a reversal film, if the spectral sensitivity for red (R) light of the CCD area sensor 15 agrees with that of the color photographic paper 90, it is difficult to read a color image recorded on a color print P. Further, if the spectral sensitivity for blue (B) light of the CCD area sensor 15 agrees with that of the color photographic paper 90, since the yellow density of the negative film is high and extremely weak light has to be detected, it is extremely difficult to read a color image recorded on the negative film. However, since the spectral sensitivity of the CCD area sensor 15 is set so that the peak of the spectral sensitivity for blue (B) light does not agree with the spectral absorption peak of yellow dye of the negative film in this embodiment, in the case where a color image recorded on the film F is exposed to blue (B) light through the color separation unit 13, irrespective of whether of the color image is recorded on a negative or reversal film, the color image can be read by the CCD area sensor 15 as if the color image recorded with high density had been recorded with low density to generate image data. Further, since the peak of spectral sensitivity for green (G) light of the CCD area sensor 15 is set in this embodiment so as to agree with that of a color photographic paper 90 to be used for reproducing the color image recorded on the negative film and the peak of spectral sensitivity for red (R) light of the CCD area sensor 15 is set so as to be located on the side of shorter wavelength than the spectral absorption peak of cyan dye of the negative film and on the side of longer wavelength than the spectral absorption peak of cyan dye of the reversal film, it is possible to produce image data having similar tone to that of a color image reproduced on a color photographic paper by a conventional method irrespective of whether a color image was recorded on a negative film or a reversal film by effecting signal processing on R image data and B image data generated by exposing a color image recorded on a film F to red (R) light through the color separation unit 13 using G image data obtained by exposing a color image recorded on the film F to green (G) light through the color separation unit 13 and being photoelectrically detected by the CCD area sensor 15 as reference data.

Although the image data obtained by the main read-out and input to the image processing apparatus 5 are input to the arithmetic average computing means 49, the arithmetic average computing means 49 does not carry out any addition processing on the image data during the main read-out but instead forwards the lines of the input image data alternately, line by line, to the first line buffer 50*a* and the second line buffer 50*b*. During the main read-out, the CPU 60 connects only the one of the second frame memory unit 52 and the third frame memory unit 53 to which image data can be written to the input bus 63 and disconnects the other of these two frame memories and the first frame memory unit 51 from the input bus 63. In other words, while color image readout is in progress, one among the first frame memory unit 51, the second frame memory unit 52 and the third frame memory unit 53 is connected to the input bus 63, and image data are stored only in this frame memory. This arrangement is for enhancing the data processing efficiency of the color image reproducing system by making it possible to conduct preliminary read-out of the color image recorded in the next frame of the film F or color image recorded in another color print P while the image data obtained in the preceding main read-out and corresponding to the color image recorded in the preceding frame of the film F or the color image recorded in preceding color print P are being transferred to the first image processing means 61 through the output bus 64 and the selector 55, and also making it possible to complete the preliminary read-out of the color image recorded in the next frame of the film F or color image recorded in another color print P and conduct the main read-out of the color image recorded in the next frame of the film F or color image recorded in another color print P while the image data obtained in the preceding main read-out and corresponding to the color image recorded in the preceding frame of the film F or the color image recorded in preceding color print P are being transferred to the first image processing means 61 through the output bus 64 and the selector 55. Accordingly, the image data alternately stored in the first line buffer 50*a* and the second line buffer 50*b* one line at a time are transferred to a second frame memory unit 52 or the third frame memory unit 53, where the image data corresponding to R (red) are stored in the R data memory 52R or 53R, the image data corresponding to G (green) are stored in the G data memory 52G or 53G, and the image data corresponding to B (blue) are stored in the B data memory 52B or 53B. Thus, the image data corresponding to the color image recorded in one frame of the film F or one color print P are stored in the second frame memory unit 52 or the third frame memory unit 53.

After the image data obtained by the main read-out have been stored in the R data memory 52R or 53R, G data memory 52G or 53G and the B data memory 52B or 53B of the second frame memory unit 52 or the third frame memory unit 53, the image data are output to the first image processing means 61. At this time, the CPU 60 controls the selector 55 to output to the first processing means 61 only the image data stored in one or the other of the second frame memory unit 52 and the third frame memory unit 53.

In accordance with lookup tables or matrix computation, the color density gradation converting means 100, the color saturation converting means 101, the digital magnification converting means 102, the frequency processing means 103 and the dynamic range converting means 104 of the first image processing means 61 effect image processing on the input image data such as color density gradation conversion, color saturation conversion, tone conversion, digital magnification conversion, frequency processing, dynamic range conversion and the like.

As described above, in this embodiment, the spectral sensitivity of the CCD area sensor 15 is set so that the peak of spectral sensitivity for green (G) light thereof agrees with the peak of spectral sensitivity for green (G) light of a color photographic paper to be used for reproducing a color image recorded on a negative film, that the peak of spectral sensitivity for red (R) light thereof is located on the side of shorter wavelength than the spectral absorption peak of cyan dye of the negative film and on the side of longer wavelength than the spectral absorption peak of cyan dye of the reversal film and that the peak of spectral sensitivity for blue (B) light thereof does not agree with the spectral absorption peak of yellow dye of the negative film. Therefore, based on the G image data, the color density gradation converting means 100 corrects the density signals of the R image data and the B image data.

FIG. 11 shows histograms of density for explaining density correction processing effected by the color density gradation converting means 100. In FIG. 11, the ordinate axis indicates frequency and the abscissa axis indicates density. The curve indicated by the solid line in FIG. 11 (*a*) shows the histogram of density levels of the R image data, the curve indicated by the solid line in FIG. 11 (*b*) shows the histogram of density levels of the G image data, and the curve indicated by the solid line in FIG. 11 (*c*) shows the histogram of density levels of the B image data. As shown in FIG. 11, the ranges of the density levels of the R image data density level histogram and the B image data density level histogram are narrower than the range of density levels of the G image data density level histogram. Accordingly, the color density gradation converting means 100 corrects the R image data and the B image data so that the maximum values of density levels thereof are equal to the maximum value of density level of the G image data and also corrects them so that the minimum values of density levels thereof are equal to the minimum value of density level of the G image data. The curves indicated by the broken lines in FIG.

11 (a) and (c) show the R image data and the B image data which have been density-corrected by the color density gradation converting means 100.

The image data image-processed by the first image processing means 61 are output to the data synthesizing means.

If the operator inputs an instruction signal through the keyboard 69 indicating that the image data obtained by reading out the color image is to be merged with other data, the CPU 60 outputs a data merge signal to the data synthesizing means 75 and the data synthesizing means 75 reads the graphic, character or other image data to be merged from the merge data memory 76 and synthesizes it with the image data obtained by reading out the color image. On the other hand, if no such a instruction signal is input through the keyboard 69, no further processing is conducted and the image data are output from the data synthesizing means 75 to the image output apparatus 8.

When the image data are input to the image output apparatus 8 from the data synthesizing means 75 of the image processing apparatus 5 through the interface 77 and the interface 78, the image data are stored in image data memory 80 consisting of multiple frame memories. Since the operation of read-out of a color image recorded on a film F or a color image recorded on a color print P is not synchronized with the operation of the image output apparatus 8, the image data read out by the image read-out apparatus 1 and image-processed by the image processing apparatus 5 are input to the image output apparatus 8 without any relation to the processing in the image output apparatus 8. The image output apparatus 8 is therefore equipped with the image data memory 80 whose multiple frame memories progressively store the image data input from the image processing apparatus 5. This arrangement ensures the ability of the image output apparatus 8 to reproduce color images on the color photographic paper 90 at the prescribed speed even when it is receiving image data being read out by the image read-out apparatus 1 at a high speed.

Figure 12:
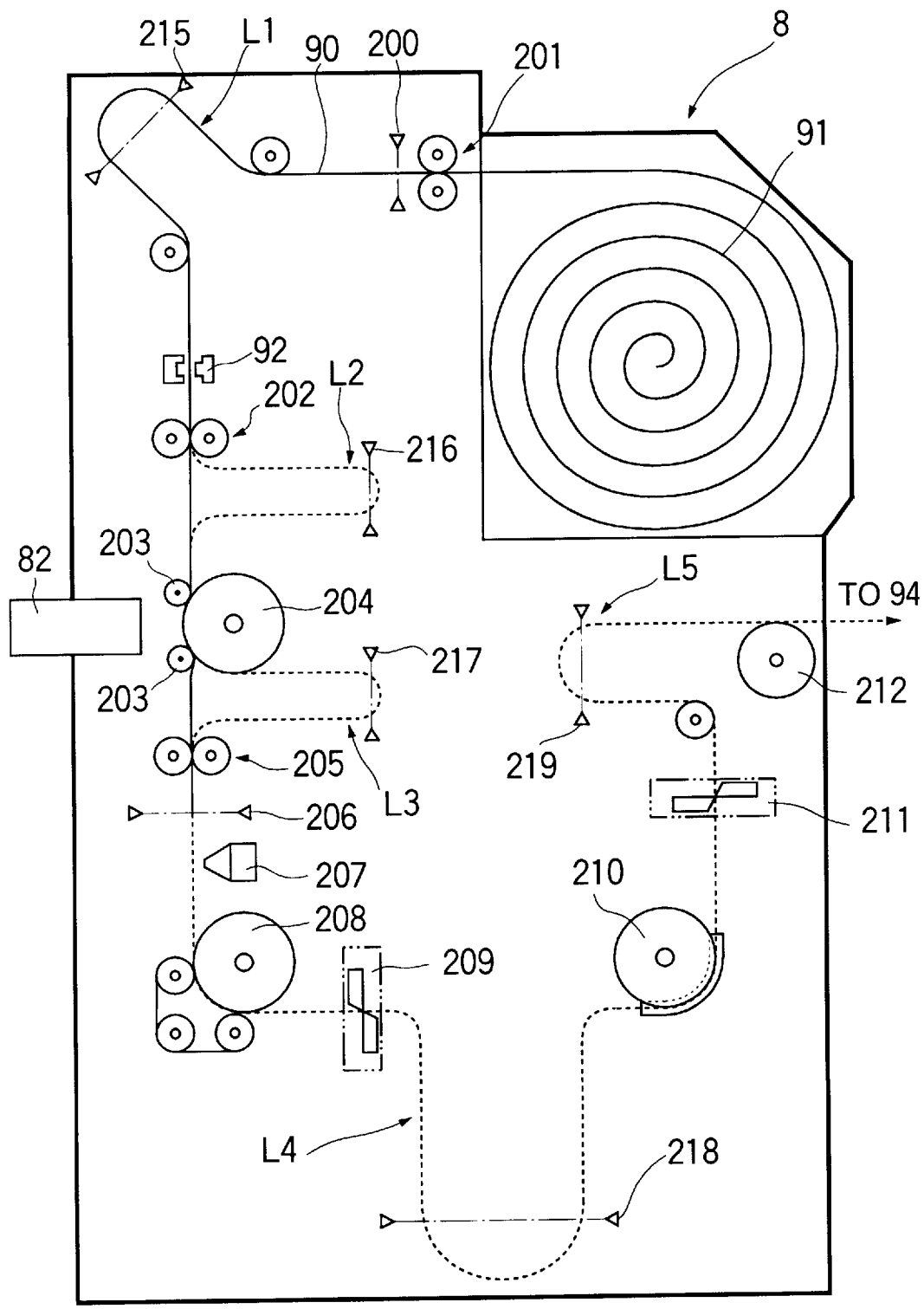
FIG. 12 is a schematic view showing the particulars of an image output apparatus upstream of a color development tank when the image output apparatus is started.

The operations of the various means of the image output apparatus 8 are controlled by the CPU 79. When the image output apparatus 8 is actuated, the web-like color photographic paper 90 in an initial condition with its leading end portion drawn out of the magazine 91 and held by the first conveyance roller pair 201 is progressively drawn out from the magazine 91 by the first conveyance roller pair 201. After the first loop L1 of the color photographic paper 90 has been formed, the color photographic paper 90 is conveyed to the second conveyance roller pair 202 via the perforating means 92. The color photographic paper 90 is then conveyed to the portion between the third conveyance roller pair 203 and the drum 204 and further conveyed to the fourth conveyance roller pair 205. At this time, the second loop L2 and the third loop L3 are not formed. When the web-like color photographic paper 90 is further conveyed and as shown in FIG. 12, the leading end portion thereof is detected by the second sensor 206, and the rotation of the first conveyance roller pair 201, the second conveyance roller pair 202, the third conveyance roller pair 203, the drum 204 and the fourth conveyance roller pair 205 is stopped. In this state, a reference hole is formed by the perforating means 92. In this embodiment, only the portion of the color photographic paper 90 upstream of the portion where the reference hole is formed is to be exposed and, therefore, at the start of the image output apparatus operation, the portion of the color photographic paper 90 between the second sensor 206 and the perforating means 92 is not exposed and is not used for reproduction of a color image.

When the reference hole is formed in the color photographic paper 90 by the perforating means 92 in this manner, the first conveyance roller pair 201, the second conveyance roller pair 202, the third conveyance roller pair 203, the drum 204 and the fourth conveyance roller pair 205 are again rotated to restart conveying the color photographic paper 90 in the sub-scanning direction and image data are read out from the image data memory 80. The read-out image data are converted to analog signals by the D/A converter 81 and input to the modulator drive means 83 to generate a modulation signal. At the same time, the red laser beam is emitted by the semiconductor laser beam source 84a and the infrared laser beam emitted by the semiconductor laser beam sources 84b and 84c. The laser beam emitted by the semiconductor laser beam source 84b is converted to a green laser beam by the wavelength converting means 85 and the laser beam emitted by the semiconductor laser beam source 84c is converted to a blue laser beam by the wavelength converting means 86. Then, the red laser beam, the green laser beam and the blue laser beam enter the modulator 87R, the modulator 87G and the modulator 87B respectively. Modulation signals are input to the modulators 87R, 87G and 87B from the modulator drive means 83 and the modulators 87R, 87G and 87B modulate the intensities of the respective laser beams in accordance with the modulation signals, i.e., in accordance with the image data. The intensity-modulated laser beams are reflected by the reflecting mirrors 88R, 88G, 88B onto the polygonal mirror 89. The polygonal mirror 89 is rotated at a prescribed speed. The laser beams are deflected by the rotating polygonal mirror 89, pass through the f θ lens 93 and scan the surface of the color photographic paper 90 being conveyed in the sub-scanning direction. As a result, the color photographic paper 90 is scanned two-dimensionally by R, G and B laser beams. Since conveyance of the color photographic paper 90 in the sub-scanning direction is synchronized with the rotation of the polygonal mirror 89, the color photographic paper 90 is exposed to the laser beams congruously with the color image recorded on the film F or the color print P. Further, when a reference hole is formed in the color photographic paper 90 by the perforating means 92, the rotation speed of the first conveyance roller pair 201, the second conveyance roller pair 202, the third conveyance roller pair 203, the drum 204 and the fourth conveyance roller pair 205 is adjusted to form the second loop L2 between the second conveyance roller pair 202 and the third conveyance roller pair 203 and the third loop L3 between the third conveyance roller pair 203 and the fourth conveyance roller pair 205. Exposure conditions and the like are printed by the printing means 207 on the back surface of the color photographic paper 90 exposed to the laser beams and the color photographic paper 90 is fed into the color developing tank 94 via the fifth conveyance roller 208, the sixth conveyance roller 210 and the seventh conveyance roller 212.

The color photographic paper 90 forwarded to the color developing tank 94 in this manner is color-developed and, after being bleach-fixed in the bleach-fixing tank 95, is washed in the washing tank 96, thereby reproducing on the color photographic paper 90 one or more color images based on the image data image-processed by the image processing apparatus 5. The color-developed, bleach-fixed and washed color photographic paper 90 is forwarded to the drying section 97 to be dried, to the cutter 98 controlled based on the reference holes perforated in the edge of the color photographic paper 90 so as to cut it into lengths each corresponding to the length of one color image recorded in one frame of the film F or one color print P, and to a sorter 99 which sorts the cut pieces based on the individual rolls of the film F or by customer.

When the operator inputs an instruction signal through the keyboard 69 indicating that the reproducing operation should be temporarily stopped, the color photographic paper 90 is forwarded until a portion thereof exposed on the basis of the image data corresponding to an image to be finally reproduced passes through the first cutter 209 and at the time the portion of the color photographic paper 90 exposed on the basis of the image data corresponding to an image to be finally reproduced passes through the first cutter 209, the color photographic paper 90 is cut and the conveyance of the color photographic paper 90 is stopped. In this state, the second loop L2 and the third loop L3 of the web-like color photographic paper 90 are formed and the color photographic paper 90 extends beyond the second sensor 206 so that the leading end portion thereof faces the blade of the first cutter 209. Therefore, if the color photographic paper 90 is again exposed in this state, since only the color photographic paper 90 upstream of a portion thereof where the reference hole is perforated is exposed, a portion of the color photographic paper 90 extending from the perforating means 92 to the first cutter 209 via the second loop L2 and the third loop L3 cannot be exposed and cannot be used for reproduction of a color image. Since the second loop L2 and the third loop L3 are formed and the color photographic paper 90 extends beyond the second sensor 206 so that the leading end portion thereof faces the blade of the first cutter 209, the color photographic paper 90 which is not used for reproduction of a color image is longer than that when the image output apparatus 8 is started up.

In this embodiment, therefore, when the operation for reproducing a color image is restarted after it was temporarily stopped, the web-like color photographic paper 90 is wound back until the leading end portion thereof is held by the first conveyance roller pair 201 and at the time the first sensor 200 detects that the color photographic paper 90 has been wound back with the leading end portion thereof held by the first conveyance roller pair 201, similarly to the operation when the image output apparatus 8 is first started, the respective conveying means are controlled so that the color photographic paper 90 is conveyed without forming the second loop L2 and the third loop L3 until the leading end portion is detected by the second sensor 206 and the reproduction of a color image is then started.

According to the above described embodiment, when the operation for reproducing a color image is restarted after it was temporarily stopped, similarly to the operation when the image output apparatus 8 is first started, the respective conveying means are controlled so that the color photographic paper 90 is conveyed without forming the second loop L2 and the third loop L3 until the leading end portion is detected by the second sensor 206 and the reproduction of a color image is then started. Therefore, the portion of the color photographic paper 90 which is not used for reproducing a color image can be considerably reduced and the color photographic paper 90 can be efficiently utilized.

According to the above described embodiment, a CCD sensor 15 is used whose the spectral sensitivity is set so that the peak of spectral sensitivity for green (G) light thereof agrees with the peak of spectral sensitivity for green (G) light of a color photographic paper to be used for reproducing a color image recorded on a negative film, that the peak of spectral sensitivity for red (R) light thereof is located on the side of shorter wavelength than the spectral absorption peak of cyan dye of the negative film and on the side of longer wavelength than the spectral absorption peak of cyan dye of the reversal film and that the peak of spectral sensitivity for blue (B) light thereof does not agree with the spectral absorption peak of yellow dye of the negative film. Therefore, in the case where a color image recorded on the film F is exposed to blue (B) light through the color separation unit 13, the CCD area sensor 15 can, irrespective of whether the color image is recorded on a negative or reversal film, read the color image as if the color image recorded with high density had been recorded with low density to generate image data. The S/N ratio can therefore be improved even if the density of a color image is high. Further, since the peak of spectral sensitivity for green (G) light of the CCD area sensor 15 is set so as to agree with that of a color photographic paper 90 to be used for reproducing the color image recorded on the negative film and the peak of spectral sensitivity for red (R) light of the CCD area sensor 15 is set so as to be located on the side of shorter wavelength than the spectral absorption peak of cyan dye of the negative film and on the side of longer wavelength than the spectral absorption peak of cyan dye of the reversal film, it is possible to produce image data having similar tone with that of a color image reproduced on a color photographic paper 90 by a conventional method, irrespective of whether a color image is recorded on a negative film or a reversal film, by effecting signal processing on R image data and B image data using G image data obtained by exposing a color image recorded on the film F to green (G) light through the color separation unit 13 and being photoelectrically detected by the CCD area sensor 15 as reference data, and to reproduce a color image on the color photographic paper 90 with desired tone.

The present invention has thus been shown and described with reference to specific embodiments. However, it should be noted that the present invention is in no way limited to the details of the described arrangements but changes and modifications may be made without departing from the scope of the appended claims.

For example, in the above described embodiment, the CPU 26 or the CPU 46 uses the image data obtained by the preliminary read-out as the basis for adjusting the quantity of light in the main read-out by controlling the light regulating unit 12 or the light regulating unit 34 and also for controlling the storage time of the CCD area sensor 15 or the CCD line sensor 35. However, it is instead possible in the main read-out only to adjust the quantity of light by controlling the light regulating unit 12 or the light regulating unit 34 or only to control the storage time of the CCD area sensor 15 or the CCD line sensor 35. In addition or instead, moreover, it is possible to control the clock speed of the CCD area sensor 15 or the CCD line sensor 35.

Further, in the above described embodiment, the first image processing means 61 is provided with the color density gradation converting means 100, the color saturation converting means 101, the digital magnification converting means 102, the frequency processing means 103 and the dynamic range converting means 104 and the image data input thereto are subjected to color density gradation conversion, color saturation conversion, magnification conversion, frequency processing and dynamic range conversion in this order. However, if magnification conversion is carried out before frequency processing, the order of the image processing by the other processing means can be changed as desired.

Furthermore, in the above described embodiment, the reflection type image read-out apparatus 30 uses the CCD line sensor 35 to conduct color image read-out. However, a CCD area sensor can be used instead of the CCD line sensor 35.

Moreover, in the above described embodiment, the color image is reproduced on the color photographic paper 90. Instead, however, the color image can be reproduced only on the CRT 68 and not be reproduced on the color photographic paper 90.

Further, in the above described embodiments, the image data produced by the reflection type image read-out apparatus 30 are transferred pixel by pixel to the image processing apparatus 5. However, if the format altering means is constituted so as to selectively store R, G, B image data transferred line by line in the first frame memory unit 51 including the R data memory 51R, the G data memory 51G and the B data memory 51B, the second frame memory unit 52 including the R data memory 52R, the G data memory 52G and the B data memory 52B, and the third frame memory unit 53 including the R data memory 53R, the G data memory 53G and the B data memory 53B, image data can be transferred line by line every color to the image processing apparatus 5 from the reflection type image read-out apparatus 30 in such a manner that R image data in a first line, G image data in a first line and B image data in a first line are first transferred, R image data in a second line, G image data in a second line and B image data in a second line are secondly transferred and so on.

Moreover, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide an image read-out apparatus used with a color image reproducing system for photoelectrically reading out a color image recorded on a negative film, a reversal film or a color print, effecting image processing on the image data produced by converting so-obtained image data to digital signals and reproducing a color image, specifically such an image read-out apparatus for reading out a color image recorded on the negative film or the reversal film and capable of reading out the color image recorded on the negative film or the reversal film and converting so-obtained image data to digital signals so as to enable reproduction of a color image having the same tone as that reproduced on the color photographic paper by a conventional method.

I claim:

1. An image read-out apparatus comprising:
    a light source for illuminating an original image, recorded on a visual medium, with red, green, and blue light;
    a photoelectrical converting element for receiving light from the light source and converting the light into image data including a red component, a blue component, and a green component, the converting element having a spectral sensitivity peak for green (G) light agreeing with a spectral absorption peak for green (G) light of a photographic paper for reproducing the original image recorded on the visual medium;
    image processing means for processing the image data such that densities of the red component and the blue component individually correspond to a density of the green component; and
    an image output apparatus cooperating with the image processing means to produce the processed image data on the photographic paper.

2. An image read-out apparatus in accordance with claim 1, wherein the spectral sensitivity of the photoelectrical converting element is determined so that the peak red spectral sensitivity has a shorter wavelength than red light directly corresponding as a complement to the spectral absorption peak of cyan dye of a negative film as the visual medium.

3. An image read-out apparatus in accordance with claim 1 wherein the spectral sensitivity of the photoelectrical converting element is determined so that the peak blue spectral sensitivity has a different wavelength than blue light directly corresponding as a complement to the spectral absorption peak of yellow dye of a negative film as the visual medium.

4. A method for processing image data in a color image reproducing system, the method comprising the steps of:
    illuminating an original image recorded on a visual medium with red, green, and blue light;
    receiving light from the illuminated visual medium at a charge-coupled device having a peak spectral sensitivity to green light corresponding to a peak spectral absorption of a paper;
    converting the light received from the visual medium into image data having a red component, a green component, and a blue component corresponding to the red light, the green light, and the blue light, respectively;
    adjusting the spectral densities of the red component and blue component to individually correspond to the spectral density of green component; and
    reproducing a copy of the original image on the paper based on the adjusted spectral densities.

5. The method according to claim 4 wherein the adjusting step further comprises setting a blue density range of the blue component to approximately equal a green density range of the green component, each of the density ranges defined by a minimum density and a maximum density.

6. The method according to claim 4 wherein the adjusting step further comprises setting a red density range of the red component to approximately equal a green density range of the green component, each of the density ranges defined by a minimum density and a maximum density.

7. The method according to claim 4 wherein the visual medium comprises a photographic medium selected from group consisting of a negative film, a color print, and a reversal film.

8. The method according to claim 4 further comprising the step of adjusting a blue peak spectral sensitivity of the charge-coupled device to blue light such that the blue peak spectral sensitivity is offset in wavelength from a yellow peak spectral absorption of yellow dye of the visual medium.

9. The method according to claim 4 further comprising the step of adjusting a red peak spectral sensitivity of the charge-coupled device to red light such that the red peak spectral sensitivity is offset in wavelength from a cyan peak spectral absorption of cyan dye of the visual medium.

10. The method according to claim 4 wherein the visual medium comprises a negative film, the method further comprising the step of adjusting a red peak spectral sensitivity of the charge-coupled device to red light such that the red peak spectral sensitivity is shorter in wavelength than a red wavelength directly corresponding as a complement to a cyan peak spectral absorption of cyan dye of the negative film.

11. The method according to claim 4 wherein the visual medium comprises a reversal film, the method further comprising the step of adjusting a red peak spectral sensitivity of the charge-coupled device to red light such that the red peak spectral sensitivity is longer in wavelength than a red wavelength directly corresponding as a complement to a cyan peak spectral absorption of cyan dye of the reversal film.

12. The method according to claim 4 wherein the step of adjusting the spectral densities includes establishing a histogram of frequency versus density for the green component and establishing a lookup table for modifying the red component and the blue component to comply with the green component as a reference.

13. The method according to claim 4 wherein the step of adjusting the spectral densities is accomplished by a matrix computation.

* * * * *